US012502673B2

(12) United States Patent
Wilson et al.

(10) Patent No.: US 12,502,673 B2
(45) Date of Patent: Dec. 23, 2025

(54) MAGNETIC PARTICLE EXTRACTION IN AN EWOD INSTRUMENT

(71) Applicant: Sharp Life Science (EU) Limited, Oxford (GB)

(72) Inventors: Adam Christopher Wilson, Oxford (GB); Peter Neil Taylor, Oxford (GB); Sally Anderson, Oxford (GB); Philip Mark Shryane Roberts, Oxford (GB); Adrian Marc Simon Jacobs, Oxford (GB); Leslie Anne Parry-Jones, Oxford (GB); Benjamin James Hadwen, Oxford (GB)

(73) Assignee: Sharp Life Science (EU) Limited, Uxbridge (GB)

( * ) Notice: Subject to any disclaimer, the term of this patent is extended or adjusted under 35 U.S.C. 154(b) by 851 days.

(21) Appl. No.: 17/617,694

(22) PCT Filed: Jun. 12, 2020

(86) PCT No.: PCT/EP2020/066408
§ 371 (c)(1),
(2) Date: Dec. 9, 2021

(87) PCT Pub. No.: WO2020/249804
PCT Pub. Date: Dec. 17, 2020

(65) Prior Publication Data

US 2022/0234046 A1 Jul. 28, 2022

Related U.S. Application Data

(60) Provisional application No. 62/861,536, filed on Jun. 14, 2019.

(51) Int. Cl.
*B01L 3/00* (2006.01)
*B03C 1/02* (2006.01)

(52) U.S. Cl.
CPC ... *B01L 3/502792* (2013.01); *B01L 3/502753* (2013.01); *B01L 3/502761* (2013.01);
(Continued)

(58) Field of Classification Search
CPC ................ B03C 1/02; B01L 3/502792; B01L 3/502753; B01L 3/502761;
(Continued)

(56) References Cited

U.S. PATENT DOCUMENTS 5,523,231 A 6/1996 Reeve
7,163,612 B2 1/2007 Sterling et al.
(Continued)

OTHER PUBLICATIONS

International Search Report for related International Application No. PCT/EP2020/066408 mailed Dec. 14, 2020.
(Continued)

*Primary Examiner* — Shogo Sasaki
(74) *Attorney, Agent, or Firm* — Renner, Otto, Boisselle & Sklar, LLP

(57) ABSTRACT

A method of operating an EWOD device to employs a magnetic field to separate magnetically responsive particles from a polar liquid droplet. The method includes the steps of dispensing a liquid droplet onto an element array of the EWOD device, wherein the liquid droplet includes magnetically responsive particles; performing an electrowetting operation to move the liquid droplet along the element array to a location relative to a magnet element in proximity to that location of the EWOD device; operating the magnet element to apply a magnetic field to the liquid droplet, wherein at least a portion of the magnetically responsive particles aggregate within the liquid droplet in response to the magnetic field; and separating the aggregated magnetically responsive particles from the liquid droplet with the magnetic field, wherein the aggregated magnetically responsive particles move in response to the magnetic field to a location
(Continued)

on the element array in proximity to the magnet element. Embodiments of the methods of the present application may be performed by an EWOD control system executing program code stored on a non-transitory computer readable medium.

19 Claims, 35 Drawing Sheets

(52) U.S. Cl.
CPC ......... *B03C 1/02* (2013.01); *B01L 2400/0427* (2013.01); *B01L 2400/043* (2013.01)

(58) Field of Classification Search
CPC ..... B01L 2200/0668; B01L 2200/0673; B01L 2400/0427; B01L 2400/043
See application file for complete search history.

(56) References Cited

U.S. PATENT DOCUMENTS

| | | | |
|---|---|---|---|
| 7,439,014 | B1 | 10/2008 | Pamula et al. |
| 8,093,064 | B2 | 1/2012 | Shah et al. |
| 8,173,000 | B1 | 5/2012 | Hadwen et al. |
| 8,653,832 | B2 | 2/2014 | Hadwen et al. |
| 9,421,555 | B2 * | 8/2016 | Lee ........................... B03C 1/02 |
| 9,782,775 | B2 * | 10/2017 | Akella .................. F04B 19/006 |
| 11,738,345 | B2 * | 8/2023 | Soto-Moreno .... B01L 3/502792 422/504 |
| 11,951,481 | B2 * | 4/2024 | Wu ........................... B01L 7/52 |
| 2011/0097763 | A1 | 4/2011 | Pollack et al. |
| 2015/0107995 | A1 | 4/2015 | Sista et al. |
| 2017/0038368 | A1 | 2/2017 | Apte et al. |
| 2017/0056887 | A1 | 3/2017 | Hadwen et al. |
| 2017/0076676 | A1 | 3/2017 | Hadwen |
| 2017/0138901 | A1 | 5/2017 | Norton |
| 2018/0078934 | A1 | 3/2018 | Hadwen et al. |
| 2021/0060556 | A1 * | 3/2021 | Yao .................. B01L 3/502715 |

OTHER PUBLICATIONS

Examination Report for corresponding European Application No. 20734124.9 dated Dec. 12, 2024.

* cited by examiner

MAGNETIC PARTICLE EXTRACTION IN AN EWOD INSTRUMENT

TECHNICAL FIELD

The present invention relates to droplet microfluidic devices, and more specifically to Active Matrix Electrowetting-On-Dielectric (AM-EWOD) devices, and to methods for the manipulation and separation of magnetically responsive particles from droplets of fluid in a microfluidic device.

BACKGROUND ART

Electrowetting on dilectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 is a drawing depicting an exemplary EWOD based microfluidic system. In the example of FIG. 1, the microfluidic system includes a reader 32 and a cartridge 34. The cartridge 34 may contain a microfluidic device, such as an AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

In the example of FIG. 1, an external sensor module 35 is provided for sensing droplet properties. For example, optical sensors as are known in the art may be employed as external sensors for sensing droplet properties, which may be incorporated into a probe that can be located in proximity to the EWOD device. Suitable optical sensors include camera devices, light sensors, charged coupled devices (CCD) and similar image sensors, and the like. A sensor additionally or alternatively may be configured as internal sensor circuitry incorporated as part of the drive circuitry in each array element. Such sensor circuitry may sense droplet properties by the detection of an electrical property at the array element, such as impedance or capacitance.

FIG. 2 is a drawing depicting additional details of the exemplary AM-EWOD device 36 in a perspective view. The AM-EWOD device 36 has a lower substrate assembly 44 with thin film electronics 46 disposed upon the lower substrate assembly 44. The thin film electronics 46 are arranged to drive array element electrodes 48. A plurality of array element electrodes 48 are arranged in an electrode or element two-dimensional array 50, having N rows by M columns of array elements where N and M may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 3. The AM-EWOD device 36 further incorporates the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

The contact angle θ for the liquid droplet is defined as shown in FIG. 3, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In operation, voltages termed the EW drive voltages, (e.g. $V_T$, $V_0$ and $V_{00}$ in FIG. 3) may be externally applied to different electrodes (e.g. reference electrode 58, element electrodes 48A and 48A, respectively). The resulting electrical forces that are set up effectively control the hydrophobicity of the hydrophobic coating 64. By arranging for different EW drive voltages (e.g. $V_0$ and $V_{00}$) to be applied to different element electrodes (e.g. 48A and 48B), the liquid droplet 52 may be moved in the lateral plane between the two substrates.

FIG. 4A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68, and which for typical layer thicknesses and materials may be on the order of a pico-Farad in value.

FIG. 4B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies. The approach of U.S. Pat. No. 7,163,612 may be termed "Active Matrix Electrowetting on Dielectric" (AM-EWOD). There are several advantages in using TFT based thin film electronics to control an EWOD array, namely:

- Electronic driver circuits can be integrated onto the lower substrate.
- TFT-based thin film electronics are well suited to the AM-EWOD application. They are cheap to produce so that relatively large substrate areas can be produced at relatively low cost.
- TFTs fabricated in standard processes can be designed to operate at much higher voltages than transistors fabricated in standard CMOS processes. This is significant since many EWOD technologies require electrowetting voltages in excess of 20V to be applied.

FIG. 5 is a drawing depicting an exemplary arrangement of thin film electronics 46 in the exemplary AM-EWOD device 36 of FIG. 2. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensor capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in liquid crystal display driving circuitry.

FIG. 6 is a drawing depicting an exemplary arrangement of the array element circuit 72 present in each array element 51, which may be used as part of the thin film electronics of FIG. 5. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:

(i) Selectively actuating the element electrode 48 by supplying a voltage to the array element electrode. Accordingly, any liquid droplet present at the array element 51 may be actuated or de-actuated by the electro-wetting effect.

(ii) Sensing the presence or absence of a liquid droplet at the location of the array element 51. The means of sensing may be capacitive or impedance, optical, thermal or some other means. Capacitive or impedance sensing may be employed conveniently and effectively using an integrated impedance sensor circuit as part of the array element circuitry.

Various methods of controlling an AM-EWOD device to sense droplets and perform desired droplet manipulations have been described. For example, US 2017/0056887 (Hadwen et al., published Mar. 2, 2017) describes the use of capacitance detection to sense dynamic properties of reagents as a way for determining the output of an assay.

Such disclosure incorporates an integrated impedance sensor circuit that is incorporated specifically into the array element circuitry of each array element. Accordingly, attempts have been made to optimize integrated impedance sensing circuitry 90 of FIG. 6 into the array element structure, and in particular as part of the array element circuitry 72. Examples of AM-EWOD devices having integrated actuation and sensing circuits are described, for example, in Applicant's commonly assigned patent documents as follows: U.S. Pat. No. 8,653,832 (Hadwen et al., issued Feb. 18, 2014); US 2018/0078934 (Hadwen et al., published Mar. 22, 2018); US 2017/0076676 (Hadwen, published Mar. 16, 2017); and U.S. Pat. No. 8,173,000 (Hadwen et al., issued May 8, 2012). The enhanced method of operation described in the current application may be employed in connection with any suitable array element circuitry 72 including any suitable integrated impedance sensing circuitry 90.

The use of functionalized magnetically responsive particles as solid phases in bio-affinity assays, or for the removal of contaminants from sample droplets, has been documented. Magnetically responsive particles may be derivatized or bound with target particles such as antibodies, receptors, nucleic acids and the like. Typically, such magnetically responsive particles may be paramagnetic or super paramagnetic and will typically have no magnetic memory in the sense that the particles are magnetically responsive while a magnetic field is applied, but do not remain magnetized once the magnetic field is removed. Under the influence of a magnetic field, the magnetically responsive particles become magnetic and as a result have a tendency to aggregate, which can be used to aggregate target species or particles that may be associated with or bound to the magnetically responsive particles.

For example, U.S. Pat. No. 5,523,231 (Reeve, issued Jun. 4, 1996) describes a method to isolate macromolecules using magnetically attractable beads, although in such processing the beads do not specifically bind to the macromolecules. U.S. Pat. No. 7,439,014 (Pamula et al., issued Oct. 21, 2008) describes a method of droplet-based surface modification and washing using magnetically responsive beads. The step of separating the magnetically responsive beads from a liquid droplet is performed by gathering the beads within a region of a liquid droplet using a magnetic field, and then splitting the droplet by electrowetting operations to isolate the portion of the droplets containing the beads. U.S. Pat. No. 8,093,064 (Shah et al., issued Jan. 10, 2012) describes a similar method, with the additional feature that the meniscus of the droplet is moved back and forth to lift beads from the surface. The process described in U.S. Pat. No. 7,439,014, and comparable conventional processes, are deficient. Because magnetic particle separation is performed by splitting the droplet with an electrowetting operation, such conventional methods result in a significant volume of the liquid from the droplet accompanying the beads after splitting, which is undesirable as maximum isolation of the beads (and any associated target particles) is desired. In addition, the washing and separating process requires a substantial footprint on the EWOD device array relative to the overall array area. This limits the space that can be used for other EWOD operations, and this reduces the overall efficiency and usefulness of the EWOD device.

SUMMARY OF INVENTION

There is a need in the art, therefore, for an improved system and method for AM-EWOD or EWOD device operation that achieves the selective separation of magnetically responsive particles from a liquid droplet within a microfluidic device, while simultaneously ensuring a large proportion of the magnetically responsive particles are effectively separated from the droplet (high bead capture efficiency), and the magnetically responsive particles are separated combined with a minimal volume of liquid. The present application describes methods for separating magnetically responsive beads or particles from a liquid droplet that achieves such results in an enhanced manner as compared to conventional configurations. In embodiments of the present application, the bead separation step is performed by varying a magnetic field in time, so as to remove the beads from the liquid droplet by applying a magnetic field to apply a force to move the beads from the liquid droplets, rather than using the electrowetting forces to achieve separation by splitting the liquid droplet as done in conventional processes.

An aspect of the invention is a method of operating an EWOD device to employ a magnetic field to separate magnetically responsive particles from a polar liquid droplet. In exemplary embodiments, the method includes the steps of dispensing a liquid droplet onto an element array of the EWOD device, wherein the liquid droplet includes magnetically responsive particles; performing an electrowetting operation to move the liquid droplet along the element array to a location relative to a magnet element in proximity to that location of the EWOD device; operating the magnet element to apply a magnetic field to the liquid droplet, wherein at least a portion of the magnetically responsive particles aggregate within the liquid droplet in response to the magnetic field; and separating the aggregated magnetically responsive particles from the liquid droplet with the magnetic field, wherein the aggregated magnetically responsive particles move in response to the magnetic field to a location on the element array in proximity to the magnet element. (As described below, separating the aggregated magnetically responsive particles from the liquid droplet with the magnetic field may occur either before or after the aggregated magnetically responsive particles move in response to the magnetic field to a location on the element array in proximity to the magnet element.) Embodiments of the methods of the present application may be performed by an EWOD control system executing program code stored on a non-transitory computer readable medium.

Embodiments of the present application have significant advantages over conventional processing. The described embodiments selectively separate magnetically responsive particles from a droplet of polar fluid with a minimal volume of polar fluid accompanying the magnetically responsive particles. Enhanced efficiency of collection of magnetically responsive particles may be achieved by the capability to perform repeated magnetic capture steps. Minimized surface area, i.e., a minimal number of array elements occupied by the separation step, within the microfluidic cartridge is used to achieve successful separation of the magnetically responsive particles. There also is a reduced likelihood of any magnetically responsive particles becoming irreversibly embedded in the microfluidic device surfaces.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DESCRIPTION OF EMBODIMENTS

Figure 1:
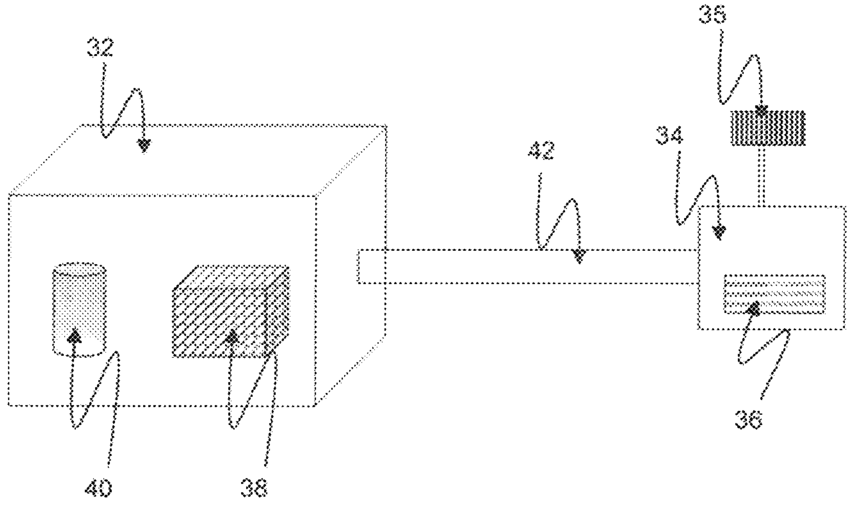
FIG. 1 is a drawing depicting an exemplary EWOD based microfluidic system.
Figure 2:
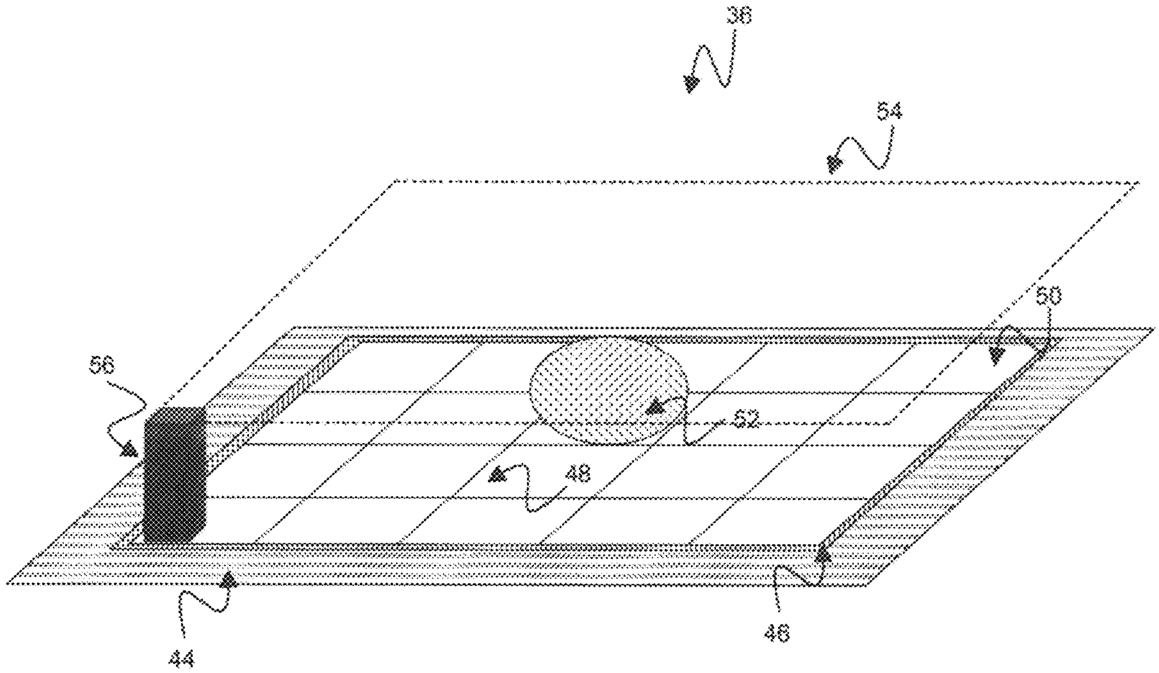
FIG. 2 is a drawing depicting an exemplary AM-EWOD device in a perspective view.
Figure 3:
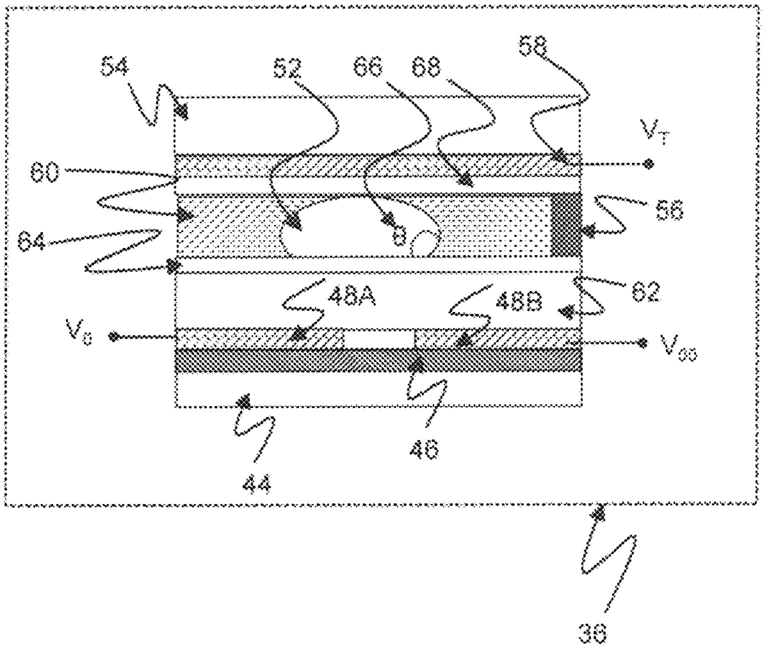
FIG. 3 is a drawing depicting a cross section through some of the array elements of the exemplary AM-EWOD device of FIG. 2.
Figure 4A:
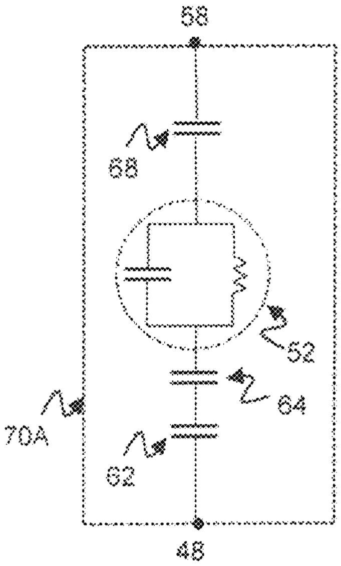
FIG. 4A is a drawing depicting a circuit representation of the electrical load presented at the element electrode when a liquid droplet is present.
Figure 4B:
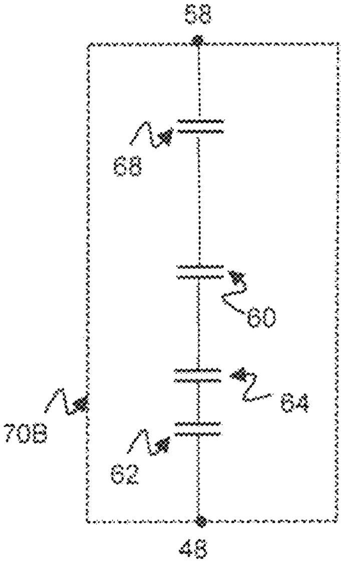
FIG. 4B is a drawing depicting a circuit representation of the electrical load presented at the element electrode when no liquid droplet is present.
Figure 5:
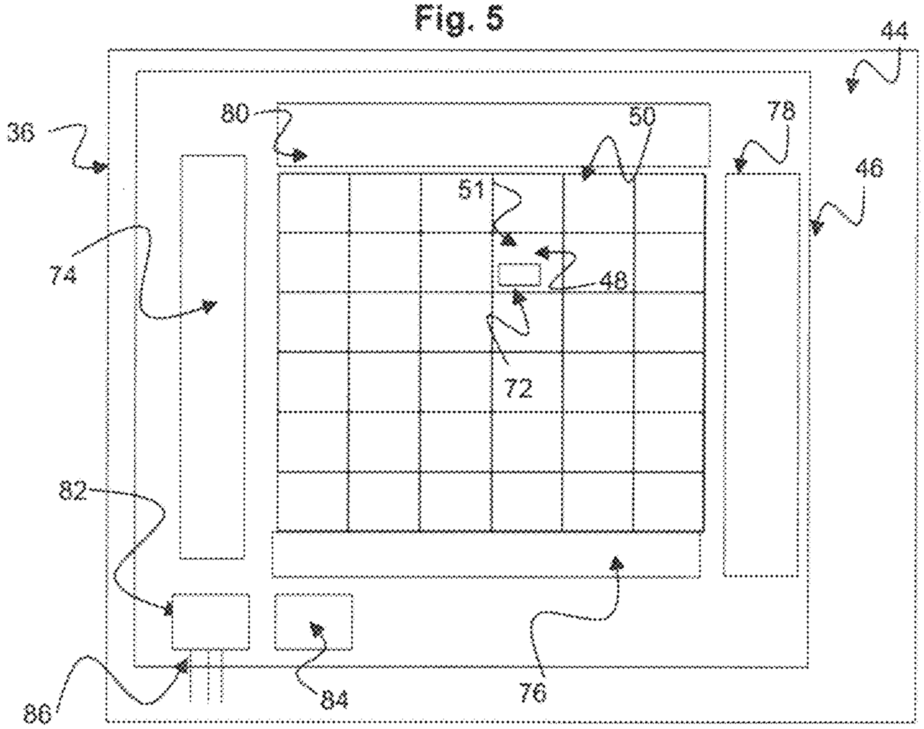
FIG. 5 is a drawing depicting an exemplary arrangement of thin film electronics in the exemplary AM-EWOD device of FIG. 2.
Figure 6:
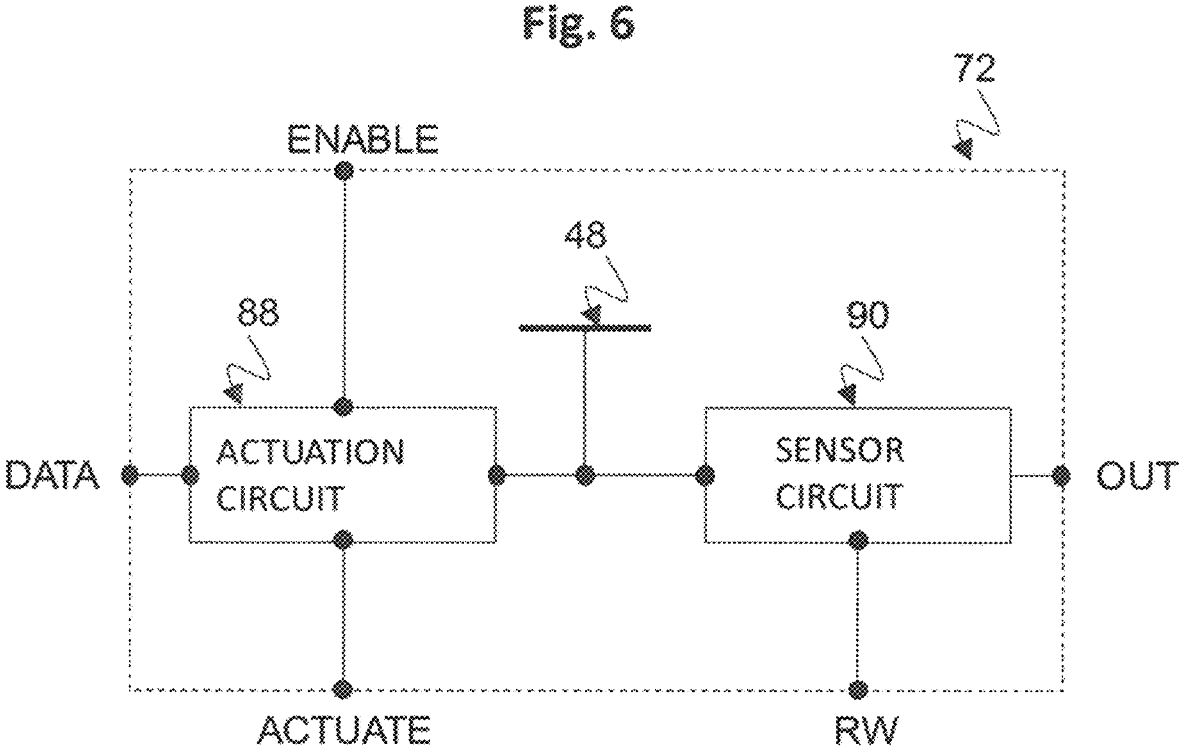
FIG. 6 is a drawing depicting exemplary array element circuitry for an AM-EWOD device.

Embodiments of the present invention will now be described with reference to the drawings, wherein like reference numerals are used to refer to like elements throughout. It will be understood that the figures are not necessarily to scale.

Embodiments of the present application provide for an improved system and method for AM-EWOD or EWOD device operation that achieves the selective separation of magnetically responsive beads or particles from a liquid droplet within a microfluidic device, while simultaneously ensuring a large proportion of the beads are effectively separated from the droplet (high bead capture efficiency), and the magnetically responsive particles or beads are separated combined with a minimal volume of liquid from the droplet. The present application describes a method for separating magnetically responsive beads or particles from a liquid droplet that achieves such results in an enhanced manner as compared to conventional configurations. In embodiments of the present application, the separation step is performed by varying a magnetic field in time, so as to remove the magnetically responsive particles from the liquid droplet by applying a magnetic field to apply a force to move the beads from the liquid droplets, rather than using the electrowetting forces to achieve separation by splitting the liquid droplet as done in conventional processes.

Figure 7:
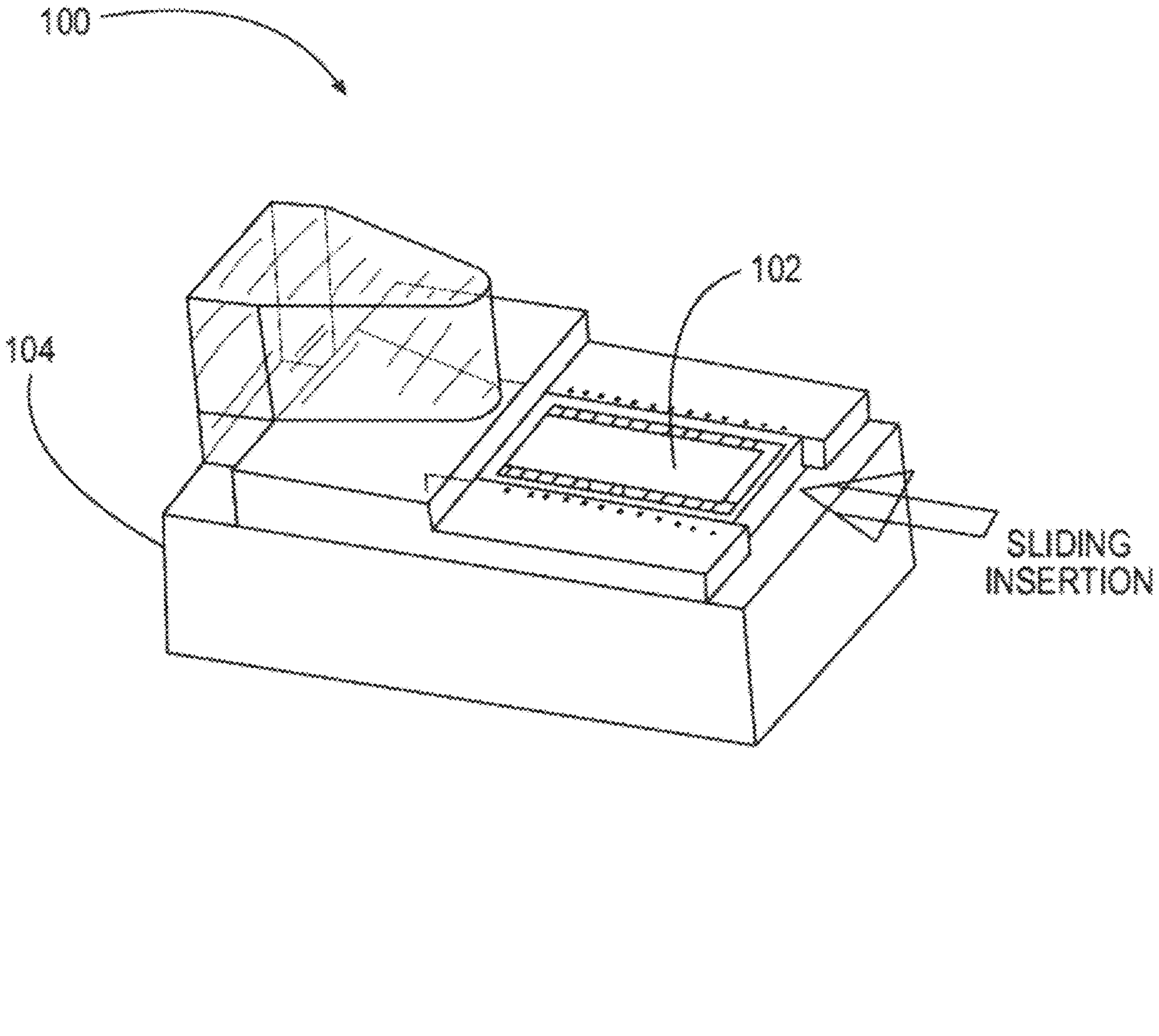
FIG. 7 is a drawing depicting a perspective view of an exemplary AM-EWOD based microfluidic system in accordance with embodiments of the present invention.
Figure 8:
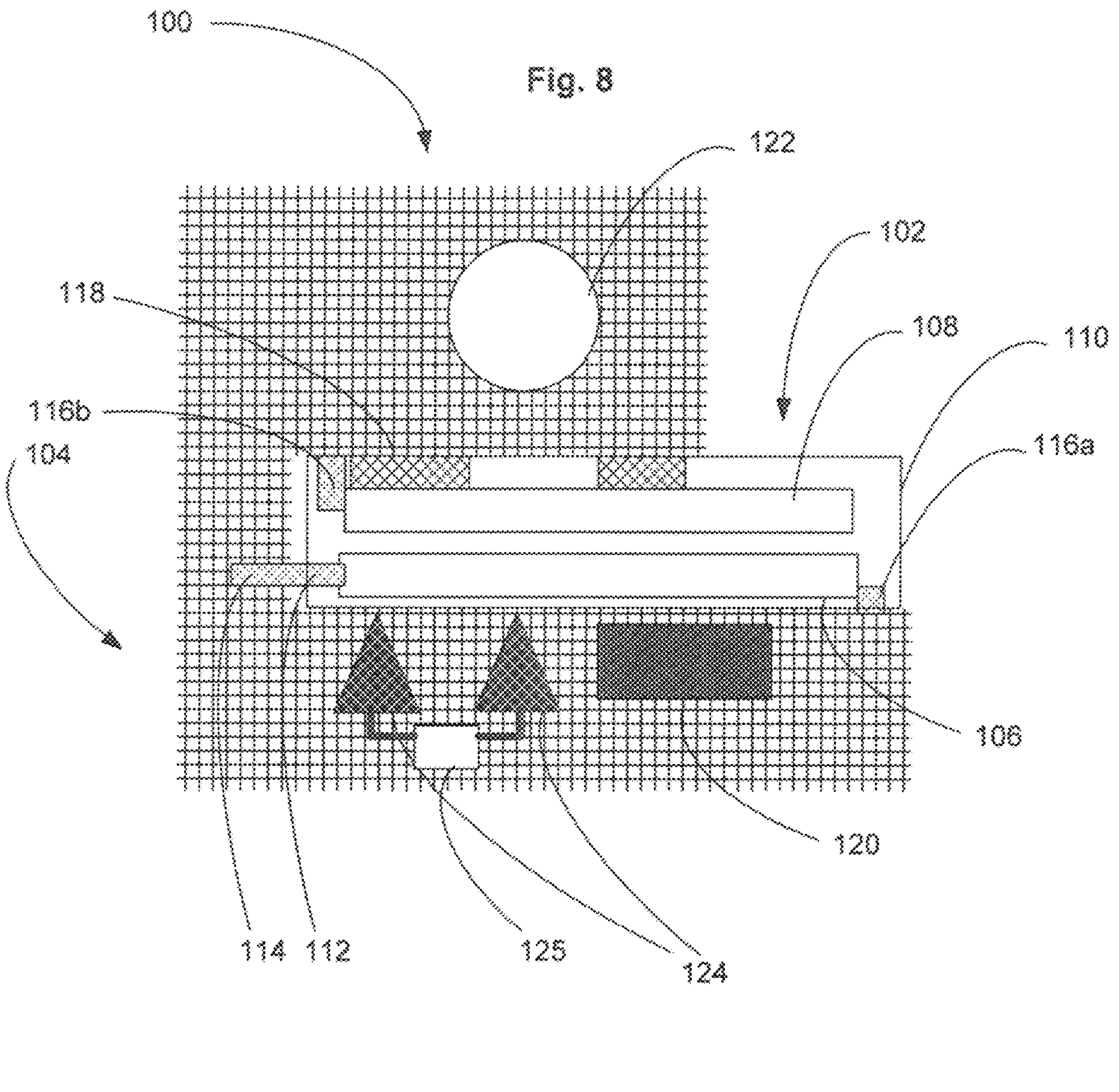
FIG. 8 is a drawing depicting a cross-sectional view of the microfluidic system of FIG. 7.

FIG. 7 is a drawing depicting a perspective view of an exemplary AM-EWOD based microfluidic system 100 in accordance with embodiments of the present invention. FIG. 8 is a schematic drawing depicting a cross-sectional view of the microfluidic system 100 of FIG. 7. The microfluidic system 100 includes a microfluidic cartridge 102, which typically is disposable and intended for one-time use, and a microfluidic instrument 104 into which the microfluidic cartridge 102 is docked, which may be performed by a sliding insertion as indicated in the figure. The microfluidic cartridge 102 is configured for EWOD or AM-EWOD operation and thus typically includes a thin film transistor (TFT) glass substrate 106, a top substrate 108, and a plastic housing 110 into which the glass substrates are embedded. The plastic housing may incorporate adhesives for securing the components in place, and internal spacer elements for spacing and sealing the two glass substrates. The microfluidic cartridge 102 also includes a first electrical connector 112 for mating to the microfluidic instrument 104 in a manner that permits electrical signals to be exchanged between the microfluidic cartridge 102 and the microfluidic instrument 104. As referenced above, the microfluidic cartridge 102 is configured for EWOD or AM-EWOD operation, and thus the TFT substrate 106 and related components may include array elements, array element circuitry, and control signal lines as described above with reference to FIGS. 1-6.

The microfluidic instrument 104 is configured to receive the microfluidic cartridge 102 and is designed to make insertion and removal of a microfluidic cartridge straightforward for the user. The microfluidic instrument 104 includes a second electrical connector 114 that mates with the first electrical connector 112 to permit the electrical signals to be exchanged between the microfluidic cartridge 102 and the microfluidic instrument 104. The microfluidic instrument 104 further includes docking features 116*a* and 116*b* for mechanically supporting and positioning the microfluidic cartridge 102 during insertion and removal. The docking features may interact with housing features 118 of the microfluidic cartridge 102 to aid in the insertion, removal, and positioning of the microfluidic cartridge 102 within the microfluidic instrument 104. It will be appreciated that any suitable configuration of docking features and cooperating housing features may be employed. Docking may be achieved by sliding insertion, clamping, or any other mechanical means suitable for positioning the microfluidic cartridge within the instrument.

The microfluidic instrument 104 may have a benchtop format, that for example is designed for use in an analytical laboratory. The microfluidic instrument 104 also may be miniaturized into a hand-held format that for example is appropriate for point-of-care applications in medical treatment facilities. The microfluidic instrument 104 includes components that permit control of the microfluidic cartridge 102 to perform a variety of chemical and biochemical reaction protocols and scripts by AM-EWOD operation. The microfluidic instrument 104, therefore, may include the following components: control electronics for supplying voltage supplies and timing signals for controlling actuation and de-actuation of the AM-EWOD array elements; heater elements 120 for heating portions of the AM-EWOD array elements to control the temperature of the liquid droplets, which is desired or required for certain reaction protocols; optical components or sensors 122 that measure optical properties of droplets on the AM-EWOD element array; magnet elements 124 for applying magnetic fields to the liquid droplets and the AM-EWOD element array; and features for liquid input or extraction, such as for example pipettes incorporated into the microfluidic instrument. The optical components 122 may include both light sources, such as for example light-emitting diodes (LEDs) or laser diodes, for illuminating liquid droplets, and also detection elements, such as for example photodiodes or other image sensors for detecting the optical signals returned from the liquid droplet. Optical measurements of liquid droplets may employ sensing techniques such as absorbance, fluorescence, chemiluminescence, and the like.

As to the magnets 124, as referenced above many reaction protocols employ the use of magnetically responsive particles, such as magnetic beads, within liquid droplets to perform purification or "washing" steps. By using magnetic fields applied from magnets in the microfluidic instrument, magnetic beads may be clumped together or released and be moved through the body of the liquid droplet to perform such washing steps. More specifically, the use of functionalized magnetically responsive particles may be used as solid phases in bio-affinity assays, or for the removal of contaminants from sample droplets. Magnetically responsive particles may be derivatized or bound with target particles such as antibodies, receptors, nucleic acids and the like. Typically, such magnetically responsive particles are paramagnetic or super-paramagnetic and have no magnetic memory in the sense that the particles are magnetically responsive while a magnetic field is applied, but do not remain magnetized once the magnetic field is removed. Under the influence of a magnetic field, the magnetically responsive particles become magnetic and as a result have a tendency to aggregate, which can be used to aggregate target species or particles that may be associated with or bound to the magnetically responsive particles. The size and materials used for the beads used is application dependent. Typically beads will have diameters in the range 5 nm-100 nm, though in some applications larger beads may be employed (diameters in the micron range). Typically, beads include a magnetic core (e.g. iron oxide) surrounded by a polymer, and are coated with bio-molecules designed to capture a species of interest, for example streptavidin for an immunoassay or oligonucleotide capture probes if the bead is designed to capture DNA.

The magnets 124 may be permanent magnets that are moveable in a direction perpendicular to the microfluidic cartridge 102 so as to be closer to or withdrawn from the microfluidic cartridge 102. When in the close or elevated position, a magnetic field is applied to the microfluidic cartridge 102 and any droplets located on the microfluidic cartridge in the area of one of the magnets. When the magnets are withdrawn away from the microfluidic cartridge 102, the magnetic field becomes insignificant and thus no significant magnetic force is applied to any magnetic beads residing within any liquid droplets within the microfluidic cartridge. The magnets may be moved between the elevated close position and the withdrawn position by any suitable driving mechanism 125. In an alternative embodiment, the magnets may be electromagnets that are turned on or off to selectively apply a magnetic field to the microfluidic cartridge.

The microfluidic cartridge 102 includes a two-dimensional active matrix array of array elements having electrodes on which the droplets are manipulated, such as described above with respect to FIGS. 1-6. Actuation patterns applied to individual electrodes are controlled to perform various droplet manipulations as described above in connection with FIGS. 1-6. Typical electrode widths are 200 um, 100 um, or may be as small as 50 um. The liquid droplets may be of corresponding size or bigger if they encompass multiple electrodes, for example of diameters up to 5 mm, and may be positioned in x-y space to array-element size precision for performing droplet manipulation operations.

Figure 9:
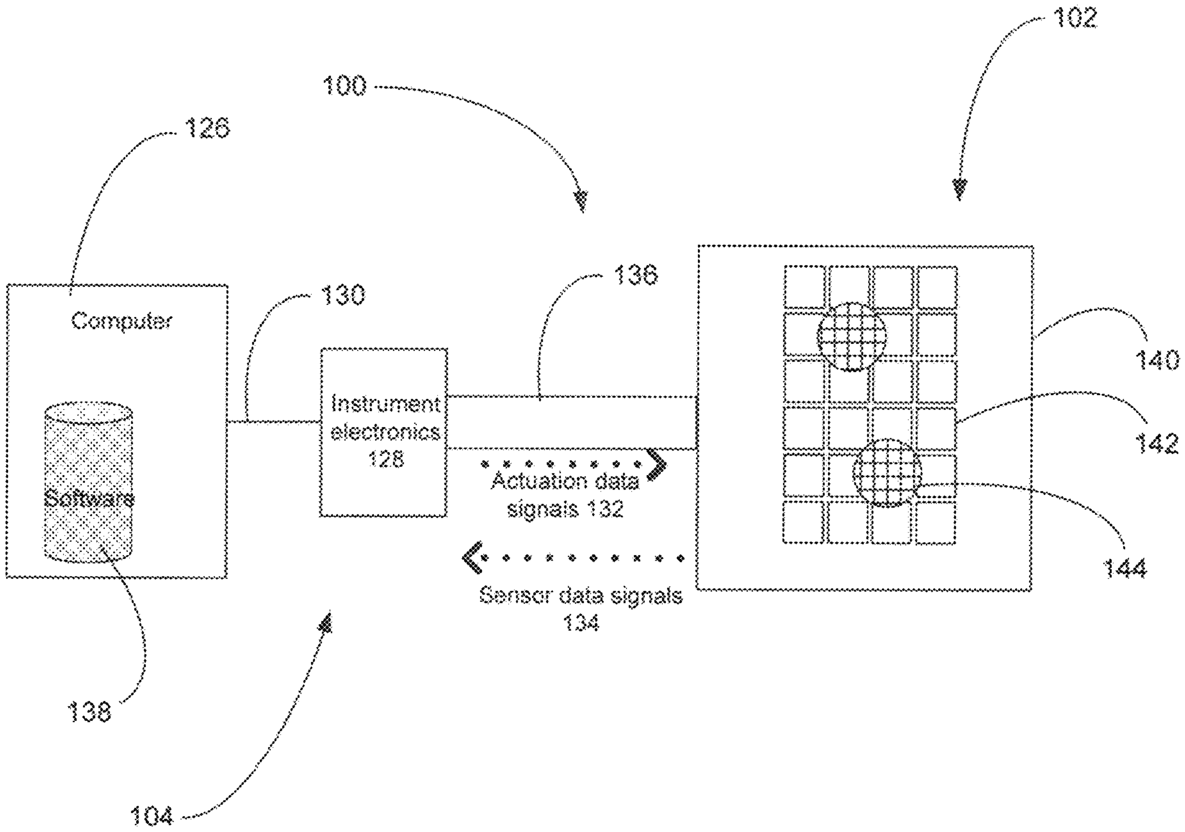
FIG. 9 is a drawing depicting a block diagram of operative portions of the exemplary microfluidic system of FIGS. 7 and 8.

FIG. 9 is a drawing depicting a block diagram of operative portions of the exemplary microfluidic system 100 of FIGS. 7 and 8. Similarly, as described with respect to FIG. 1, the microfluidic instrument 104 may include a computer-based control system 126 that controls instrument electronics 128 via a data link 130. Under such control, the instrument electronics supplies actuation data signals 132, and reads out sensor data signals 134, via an instrument/cartridge electrical connector interface 136 (e.g., including the electrical connectors 112 and 114 of FIG. 8). The control system 126 may include a storage device 138 that may store any application software and any data associated with the system. The control system 126 and instrument electronics 128 may include suitable circuitry and/or processing devices that are configured to carry out various control operations relating to control of the microfluidic cartridge 102, such as a CPU, microcontroller or microprocessor. The microfluidic cartridge 102 includes an element array 140 of individual array elements 142 comparably as described above, upon which liquid droplets 144 may be dispensed to perform droplet manipulation operations by actuating and de-actuating one or more array elements in accordance with the actuation data signals 132. The sensor data signals 134 further may be outputted by circuitry of the microfluidic cartridge 102 to the instrument electronics 128.

Accordingly, the control system 126 may execute program code embodied as a control application stored within the storage device 138. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 138 may be configured as a non-transitory computer readable medium, such as a random access memory (RAM), a read-only memory (ROM), an erasable programmable read-only memory (EPROM or Flash memory), or any other suitable medium. Also, while the code may be executed by control system 126 in accordance with an exemplary embodiment, such control system functionality could also be carried out via dedicated hardware, firmware, software, or combinations thereof, without departing from the scope of the invention.

The control system may be configured to perform some or all of the following functions:

- Define the appropriate timing signals to manipulate liquid droplets on the AM-EWOD cartridge element array.
- Interpret input data representative of sensor information measured by a sensor or sensor circuitry associated with the AM-EWOD cartridge, including computing the locations, sizes, centroids, perimeters, and particle constituents of liquid droplets on the AM-EWOD element array.
- Use calculated sensor data to define the appropriate timing signals to manipulate liquid droplets on the AM-EWOD cartridge, i.e. acting in a feedback mode.
- Provide for implementation of a graphical user interface (GUI) whereby the user may program commands such as droplet operations (e.g. move a droplet), assay operations (e.g. perform an assay), and the GUI may report the results of such operations to the user.
- Operate the mechanical movement or electromagnetic operation of the magnet elements to selectively apply a magnetic field to the microfluidic cartridge in accordance with embodiments of the present application.

The control system 126, such as via the instrument electronics 128, may supply and control the actuation voltages applied to the electrode array of the microfluidic cartridge 102, such as required voltage and timing signals to perform droplet manipulation operations and sense liquid droplets on the AM-EWOD element array. The control system further may execute the application software to generate and output control voltages for droplet sensing and performing sensing operations.

The various methods described herein pertaining to enhanced microfluidic operation may be performed using AM-EWOD structures and devices described with respect to FIGS. 1-9, including for example any control electronics and circuitry, sensing capabilities, and control systems including any processing device that executes computer application code stored on a non-transitory computer readable medium. A reaction protocol including series and/or parallel combinations of droplet manipulation operations are typically conducted in accordance with software instructions that form a script, which may include a script specific to the particular reaction protocol being executed by the droplets. The reaction protocol also is typically conducted using feedback, whereby information from the sensors of droplet sizes and droplet positions is fedback to the software, and the sequence of droplet manipulation operations in time and/or space is adjusted.

Figure 10:
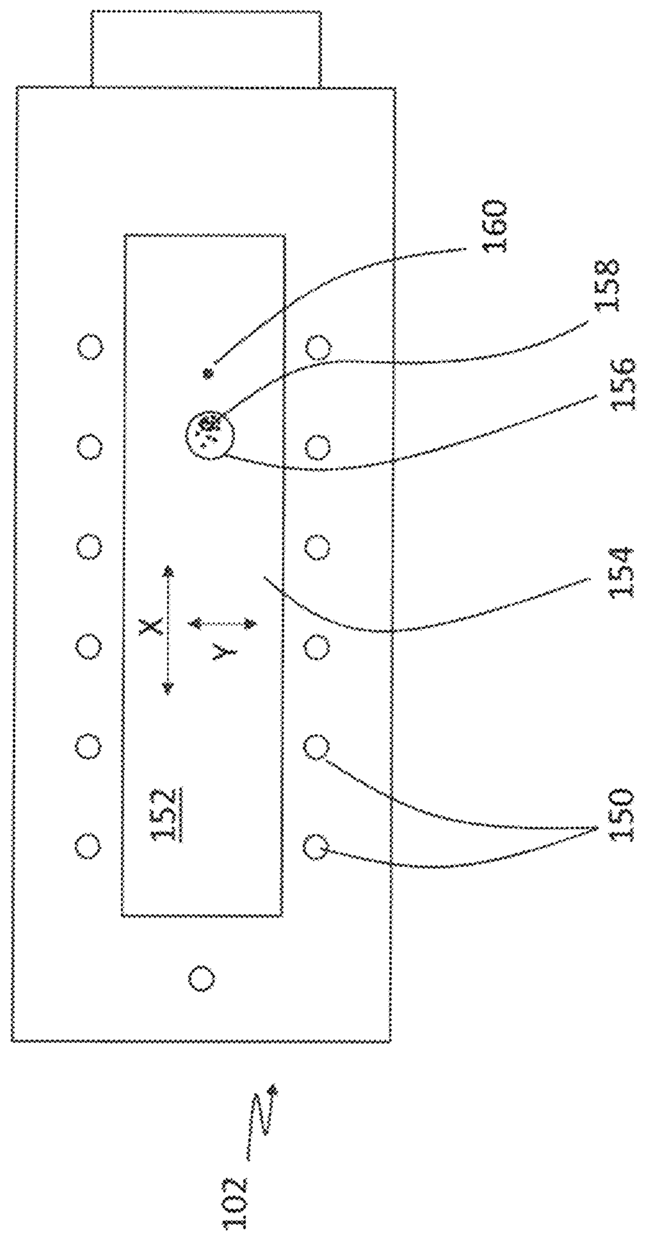
FIG. 10 is a drawing depicting an additional viewpoint illustrating features of an exemplary microfluidic cartridge of the microfluidic system.

FIG. 10 is a drawing depicting an additional viewpoint illustrating features of the exemplary microfluidic cartridge 102. The microfluidic cartridge 102 includes a plurality of sample ports 150 and a reaction chamber 152. The reaction chamber 152 includes an array of thin film transistor electrodes (not shown) on a first substrate and an opposing substrate that defines a gap therebetween. Within the gap there is disposed a non-polar fluid 154, such as an oil, within which there may be dispensed and suspended one or more liquid droplets 156 that include a polar fluid. The liquid droplet of a polar fluid 156 further may include one or more magnetically responsive particles 158. A coordinate system also is defined as to a horizontal "X" direction and a vertical "Y" direction along the reaction chamber 152, which is applicable to subsequent figures. As referenced above, the microfluidic cartridge 102 may be a disposable element, which is receivable within a microfluidic instrument such as that depicted in FIGS. 7 and 8. In an alternative embodiment the microfluidic cartridge 102 is an integral part of the microfluidic instrument.

As referenced above, the microfluidic instrument includes at least one magnet element 160 that is either physically moveable or electromagnetically operable to selectively apply a magnetic field to the microfluidic cartridge 102. FIG. 10, therefore, illustrates the position of a magnet element 160 relative to the microfluidic cartridge 102 when the cartridge is properly positioned within the microfluidic instrument. For illustrative purposes, when the magnet element 160 is positioned or otherwise operated to apply a magnetic field to the microfluidic cartridge 102, the magnet element 160 is depicted as a solid circle. Conversely, when the magnet element 160 is positioned or otherwise operated not to apply a magnetic field to the microfluidic cartridge 102, the magnet element 160 is depicted as an open circle. In the example of FIG. 10, therefore, the magnet element is applying a magnetic field to the microfluidic cartridge 102.

In use, the microfluidic cartridge 102 is operated to manipulate droplets of polar fluid 156 dispersed within the non-polar fluid 154 within the reaction chamber 152 by a process of electrowetting. In general, when a droplet of polar fluid 156 is caused to move by electrowetting, the droplet will adopt a nominally square edged profile (although other shape profiles may be achieved according to the activation pattern of respective TFT array elements), which is influenced by the generally square shaped profile of each TFT element within the device array. Thus, when a droplet of polar fluid 156 is caused to move by electrowetting, the droplet tends to adopt an edge profile shape according to the pattern of TFT elements that are actuated during the electrowetting process. In the absence of any actuated TFT elements, a droplet of polar fluid 156 typically adopts a nominally circular profile within the non-polar fluid 154. This "relaxed" shape profile is influenced by the relative surface tension difference between the respective fluids within the microfluidic cartridge 102.

As referenced above, the magnetic element 160 may be moved by any suitable driving mechanism (e.g., element 125 of FIG. 8). The magnet element or elements may be fixed to an actuator, that permits selective movement of the magnetic element(s) 160 relative to the substrate of the microfluidic cartridge 102 on which are disposed the array of TFT elements. The magnet element 160 may be moved closer to the substrate surface or farther away, such that the effect of magnetic element 160 on the fluid within the microfluidic cartridge 102 is changed. The vertical path of travel of magnet element 160 relative to the microfluidic cartridge 102 is between about 7 mm and 12 mm from the point of proximity with the external face of the TFT substrate of the microfluidic cartridge 102 and the most distant point to which magnetic element 160 can be moved away from the TFT substrate.

An aspect of the invention is a method of operating an EWOD device to employ a magnetic field to separate magnetically response particles from a polar liquid droplet. In exemplary embodiments, the method includes the steps of dispensing a liquid droplet onto an element array of the EWOD device, wherein the liquid droplet includes magnetically responsive particles; performing an electrowetting operation to move the liquid droplet along the element array to a location relative to a magnet element of the EWOD device; operating the magnet element to apply a magnetic field to the liquid droplet, wherein at least a portion of the magnetically responsive particles aggregate within the liquid droplet in response to the magnetic field; and separating the aggregated magnetically responsive particles from the liquid droplet with the magnetic field, wherein the aggregated magnetically responsive particles move in response to the magnetic field to a location on the element array in proximity to the magnet element. Embodiments of the methods of the present application may be performed by an EWOD control system executing program code stored on a non-transitory computer readable medium.

FIGS. 11A-11D are drawings depicting an exemplary method of separating magnetically responsive particles from a polar liquid droplet along an EWOD element array 162. FIGS. 12A-12E are companion drawings illustrating the process of FIGS. 11A-11D with a more closeup focus on the droplet response. A droplet of polar fluid 156 may be moved by electrowetting forces to within a fixed distance (for example approximately 4 mm in a horizontal plane) from the spatial location of magnet element 160, and the electrowetting activation is then removed so the droplet relaxes to a circular form as shown for example in FIG. 11A.

When magnet element 160 is vertically farthest from the surface of the TFT substrate, the magnet element 160 has little or no influence on any magnetically responsive particles 158 present within droplet of polar fluid 156 present in reaction chamber 152. This is so even when the droplet of polar fluid 156 containing the magnetically responsive particles 158 is directly over the location of magnet element 160. When magnet element 160 is about 7 mm in a vertical plane below the surface of the TFT substrate, the magnet element is about 8 mm on the diagonal from a droplet of polar fluid 156 that is located 4 mm horizontally away from the position of magnet element 160 on which the TFT array elements are disposed. Under such arrangement, no aggregation of magnetically responsive particles 158 within droplet of polar fluid 156 is observed.

When magnet element 160 is in the elevated or close position, such that the magnet element is brought into proximity with the external surface of microfluidic cartridge 102, the influence of the magnetic field creates a force on the magnetic particles, the force being related to the gradient of the magnetic field in the locality of the bead. This force is sufficient to cause magnetically responsive particles 158 within droplet of polar fluid 156 to initially aggregate at the edge of droplet of polar fluid 156 that is closest to the location of magnet element 160, and ultimately "jump" from the droplet 156 to be directly above and in proximity to the location of magnet element 160 on the element array 162. As referenced above, magnet element 160 alternatively may be configured as an electromagnet, which may be operated to produce a time variable magnetic field which may facilitate control over the lateral distance over which the magnetically responsive particles 158 may be caused to move under the influence of the magnetic field. The magnet element 160 may be a permanent magnet located on an actuator that raises and lowers the tip of the magnet to bring the magnet sufficiently close to the TFT element array 162 so that the magnetically responsive particles 158 may be moved from a droplet to the position in proximity to the magnet element. When a permanent magnet is used, the magnet may be shaped to control the field line pattern. To maximize the magnetic field strength/field strength gradient, a permanent magnet made from a material of high magnetic strength, such as for example neodymium, may be employed.

Referring more specifically to FIGS. 11A-11D and 12A-12E, FIG. 12A initially depicts a droplet of polar fluid 156 that has been moved by electrowetting forces into any suitable initial position relative to the magnet element 160. The droplet 156 retains the nominal square edge profile while under the influence of electrowetting forces. At this stage in the process, the magnet element 160 is not in proximity (open circle) to the microfluidic cartridge 102, and thus the magnet element 160 exerts no significant or observable influence over the magnetically responsive particles 158 within the droplet of polar fluid 156.

Figure 11A:
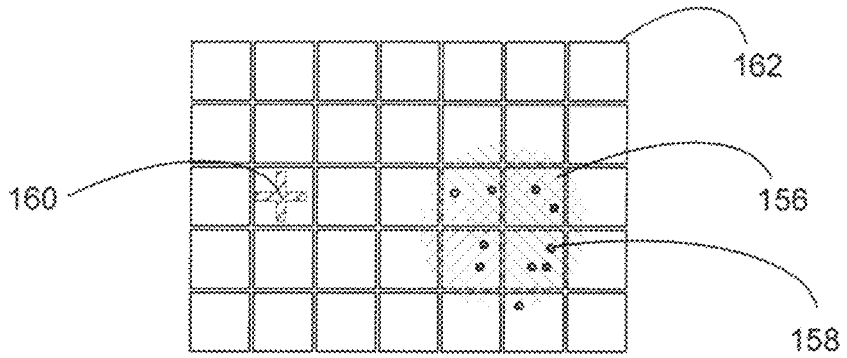
FIGS. 11A, 11B, 11C, and 11D are drawings depicting an exemplary method of separating magnetically responsive particles from a polar liquid droplet along an EWOD element array.
Figure 11B:
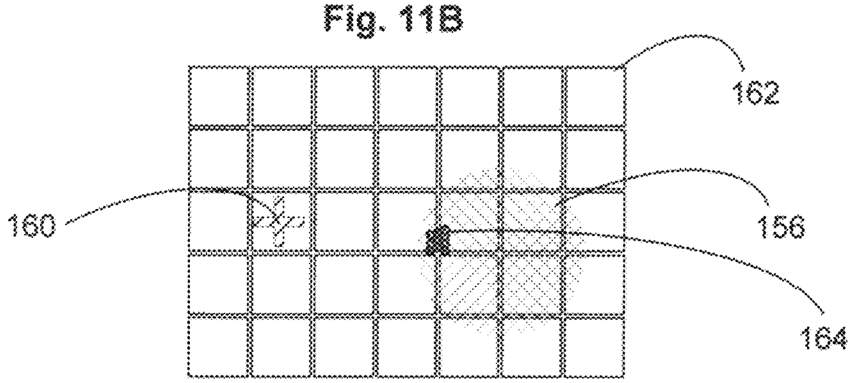
Figure 12A:
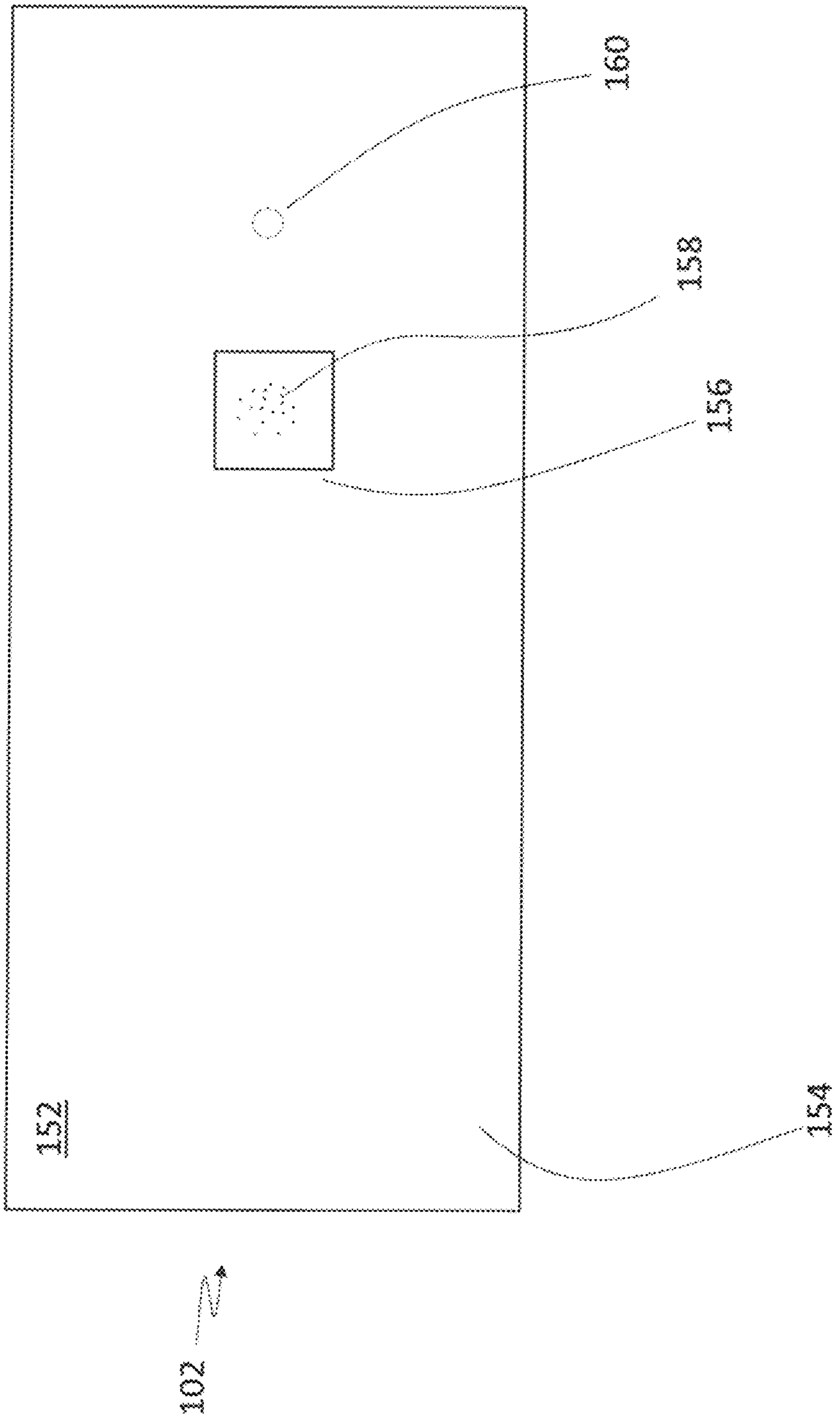
FIGS. 12A, 12B, 12C, 12D, and 12E are companion drawings illustrating the process of FIGS. 11A-11D with a more closeup focus on the droplet response.
Figure 12B:
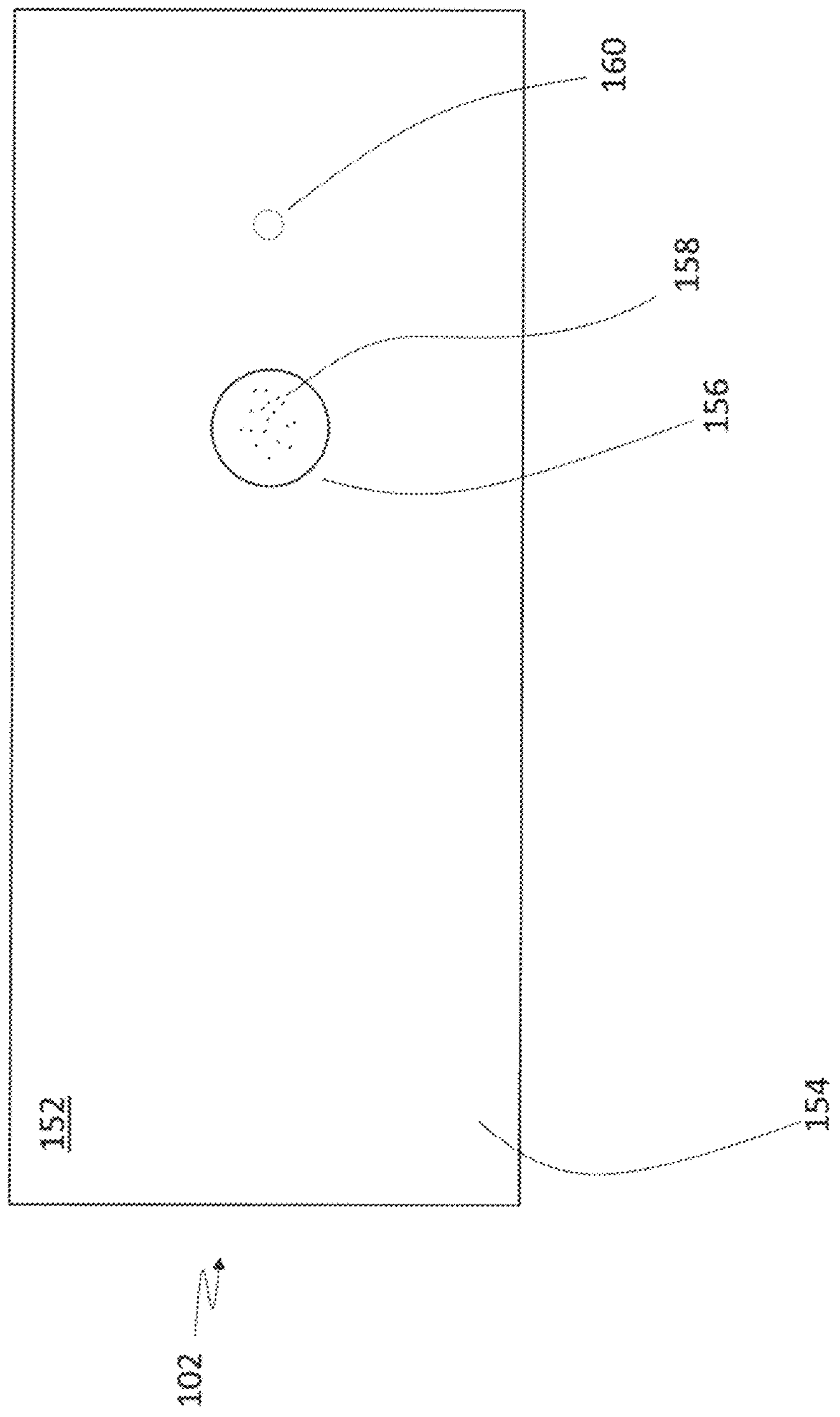
Figure 12C:
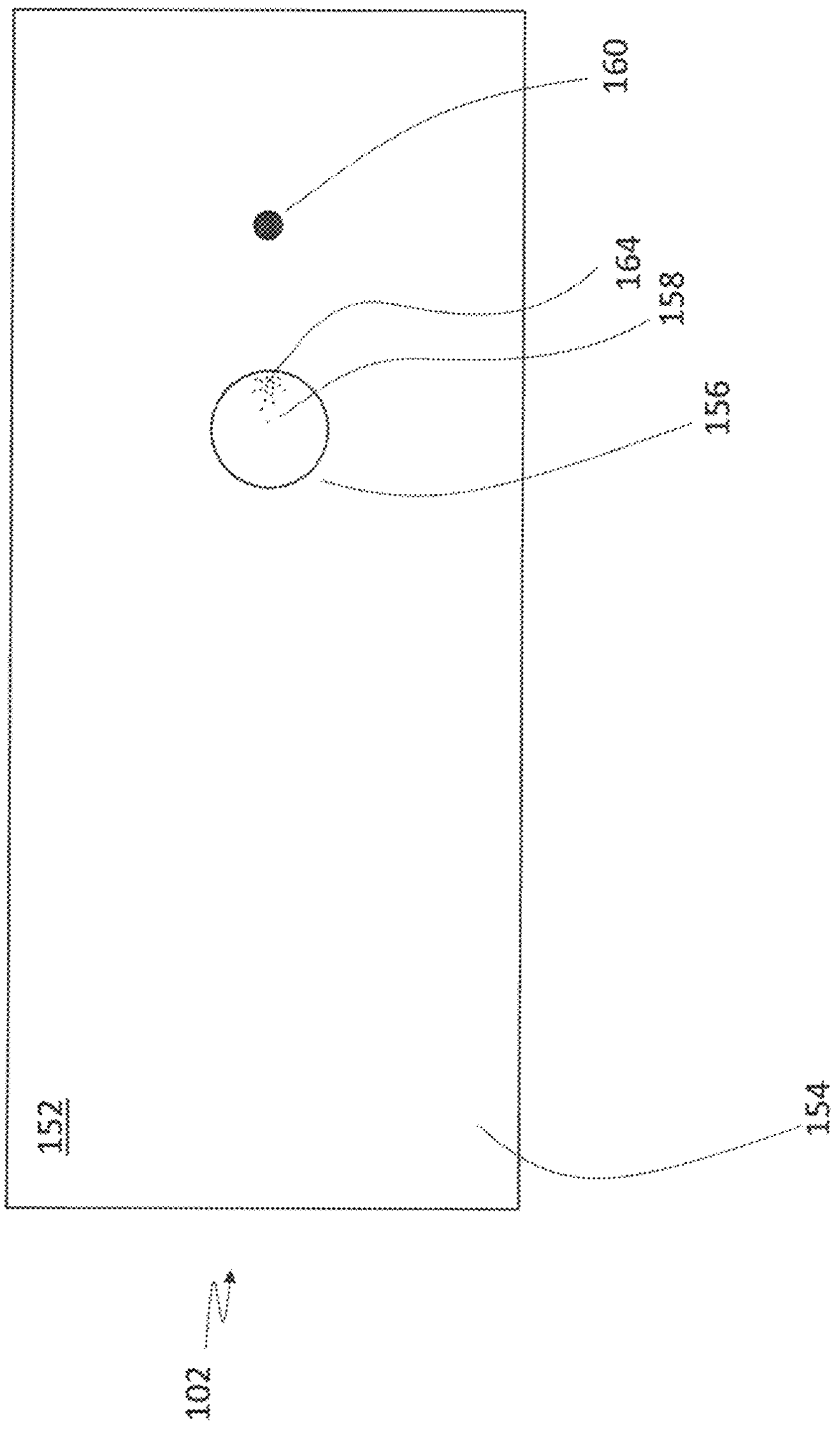

As shown in FIGS. 11A and 12B, when electrowetting forces are removed, the droplet of polar fluid 156 adopts a nominally circular profile under the influence of the relative surface tension differences between the droplet of polar fluid 156 and the non-polar fluid 154 within reaction chamber 152 of the microfluidic cartridge 102. As shown in FIGS. 11B and 12C, when magnetic element 160 (solid circle) is elevated to come into proximity of the TFT element array 162 of microfluidic cartridge 102, the magnetic field is applied to the microfluidic cartridge in the area element array that includes the liquid droplet. In response to the magnetic field, the magnetically responsive particles 158 begin to accumulate in an aggregation 164 adjacent to an edge profile of the droplet of polar fluid 156 that is closest to the location of magnetic element 160.

Figure 11C:
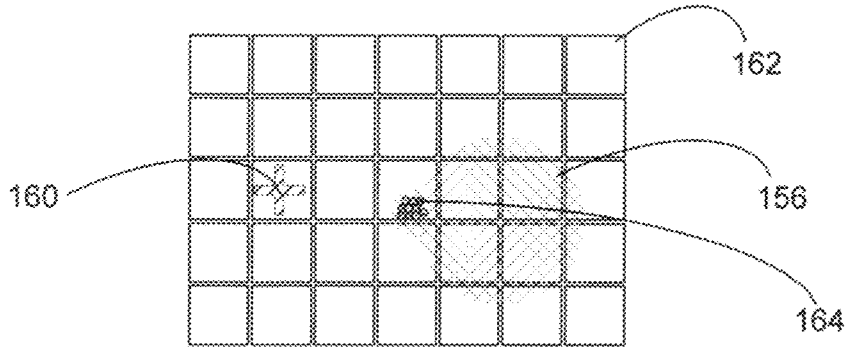
Figure 11D:
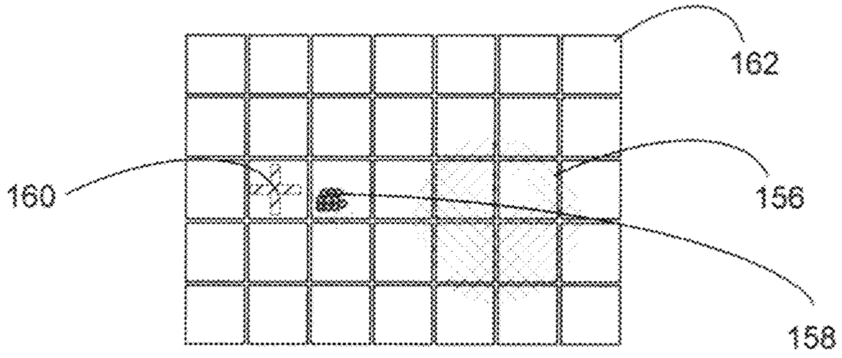
Figure 12D:
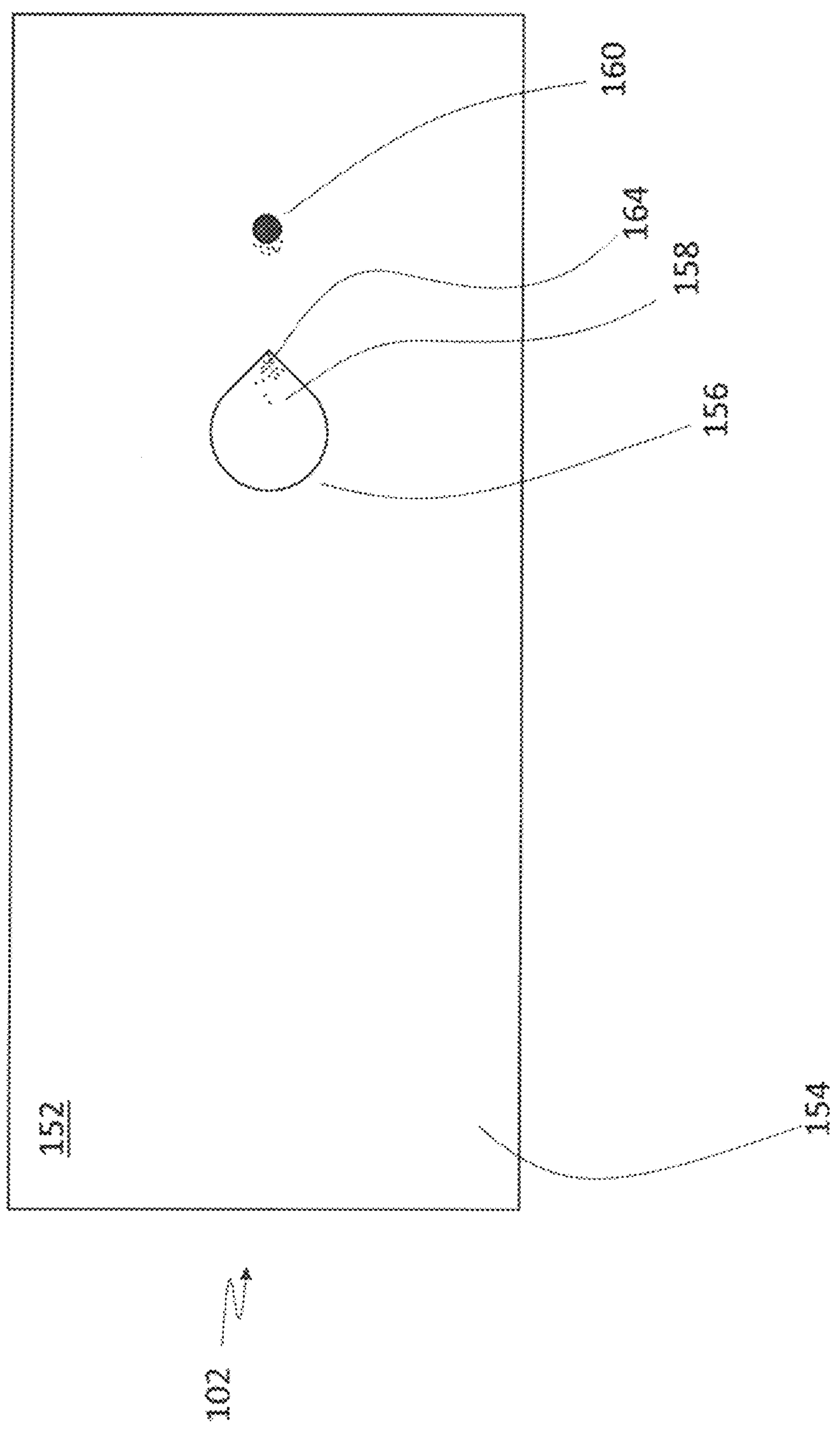
Figure 12E:
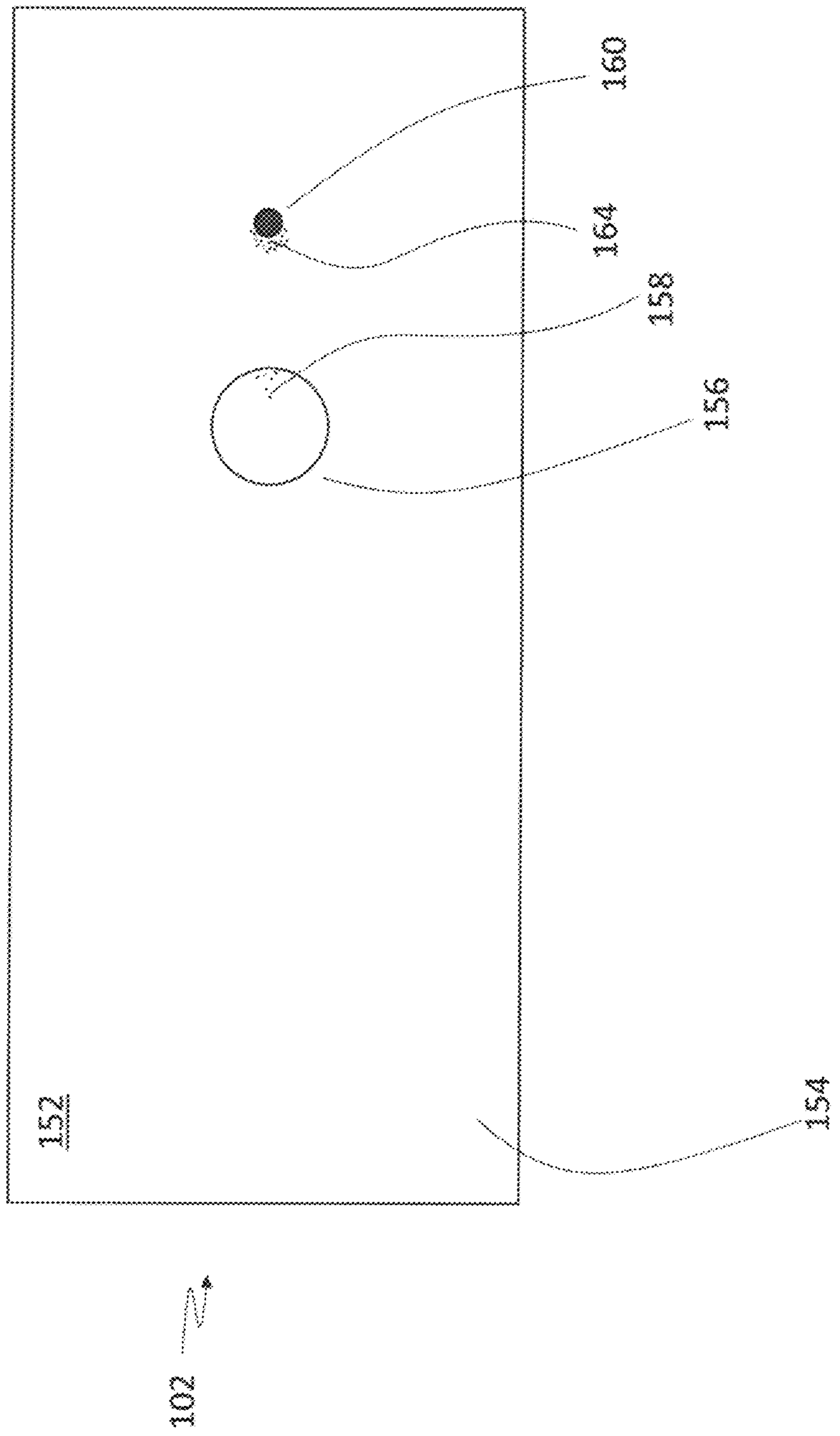

As shown in FIGS. 11C and 12D, when the accumulated aggregation 164 of magnetically responsive particles 158 reaches a sufficient number under the influence of the magnetic field of magnet element 160, the magnetically responsive particles 158 cause a distortion in the edge profile of the "relaxed" droplet of polar fluid 156. Specifically, the aggregation 164 of the magnetically responsive particles 158 causes droplet 156 to adopt a nominally teardrop shape, with the pointed end oriented towards magnet element 160. As shown in FIGS. 11D and 12E, with further aggregation of the magnetically response particles 158, once a sufficient number of magnetically responsive particles 158 have accumulated, the effect of the magnetic field provided by magnet element 160 is such that the accumulated aggregation 164 of magnetically responsive particles 158 is able to break through the now distorted meniscus between non-polar fluid 154 and the droplet of polar fluid 156. The clumped aggregation 164 of magnetically responsive particles 158 thus escapes the confines of the droplet 156, and are pulled, or jump, towards the location in proximity to the magnet element 160. The aggregated magnetically responsive particles 164 thus accumulate above the location of magnet element 160 within the non-polar fluid 154. As further shown in FIGS. 11D and 12E, once an aggregation of magnetically responsive particles that initially had accumulated around the meniscus of droplet 156 has been removed from the droplet by the magnetic field, the droplet 156 returns to the nominally circular profile.

In practice, the first removal of an aggregation 164 of magnetically responsive particles 158 may not include all such particles located within the polar droplet 156, and a substantial number of magnetically responsive particles still may remain within the droplet 156. Accordingly, the process of FIGS. 11A-11D and 12B-12E may be repeated over multiple iterations to perform substantial isolation of essentially the totality of the magnetically responsive particles 158. In this manner, when an aggregation of magnetically responsive particles is removed, additional remaining magnetically responsive particles 158 within the droplet of polar fluid 156 begin to accumulate at the edge of the droplet similarly as described above. The process of accumulation and removal may occur several iterations in succession, depending upon the original number or concentration of magnetically responsive particles 158 within droplet of polar fluid 156. The initial concentration of magnetically responsive particles 158 distributed within the 156 will alter the number of cyclic iterations of the process. The process reaches a natural cessation when the number of magnetically responsive particles 158 within the droplet of polar fluid 156 is such that the influence of the magnetic field is no longer able to cause sufficient aggregation to subsequently pull the aggregated magnetically responsive particles 164 through the meniscus between non-polar fluid 154 and droplet of polar fluid 156.

When the number of magnetically responsive particles 158 within the polar droplet 156 is or becomes insufficient for the magnetic field to remove an aggregation of said particles from the droplet, in an exemplary embodiment a step may be performed to add more magnetically responsive particles to the droplet. The added magnetically responsive particles may not participate in any of the active processes that the original magnetically responsive particles are intended to perform (i.e., the magnetically responsive particles do not bind to or interact with a target species). Rather the added magnetically responsive particles serve to ensure that the droplet 156 contains a sufficient number of magnetically responsive particles to aggregate, and subsequently move under the influence of the magnetic field from the liquid droplet 156 toward the magnet element 160. Accordingly, the addition of further magnetically responsive particles increases the likelihood of transferring as many of the original magnetically responsive particles as possible out of the droplet 156 under the influence of magnet element 160. An advantageous example adds magnetically responsive particles that are of a relatively large size as compared to the original magnetically responsive particles. Large sized magnetically responsive particles are highly susceptible to the magnetic field, and thus may be used to efficiently aggregate or "mop-up" any remaining original small sized magnetically responsive particles that participate in the reaction activity.

Under certain conditions, it has been observed that the influence of magnet element 160 may be such that rather than cause magnetically responsive particles 160 to break through the meniscus between non-polar fluid 154 and the polar droplet 156, the magnetic field instead may cause the entire droplet 156 to be pulled toward magnet element 156 until the polar droplet 156 rests over the location of magnet element 160, such that the magnetically responsive particles 158 come as close to magnetic element 160 as may be possible. Removal may then result once the droplet 156 is moved to sufficiently close proximity to the magnet element 160.

In an alternative embodiment, prior to commencing the process of removal of magnetically responsive particles 158 from the droplet of polar fluid 156, the droplet 156 may be manipulated within reaction chamber 152 under electrowetting activation while magnet element 160 is in an elevated position. During the manipulation phase, the magnetically responsive particles 158 may be caused to generally aggregate within droplet of polar fluid 156 but are not removed therefrom. Magnet element 160 may then be moved to a lowered position, before the droplet of polar fluid 156 is moved to the location from which magnetic particle removal is intended to occur, and electrowetting activation removed, before magnet element 160 is once again raised to the elevated position shown in FIG. 12A. Under certain circumstances, it may be feasible to leave magnet element 160 in a raised position prior to positioning the droplet 156 into the position from which removal of magnetically responsive particles 156 is intended to occur, before removing electrowetting activation to thereby initiate the process of removal.

Figure 13A:
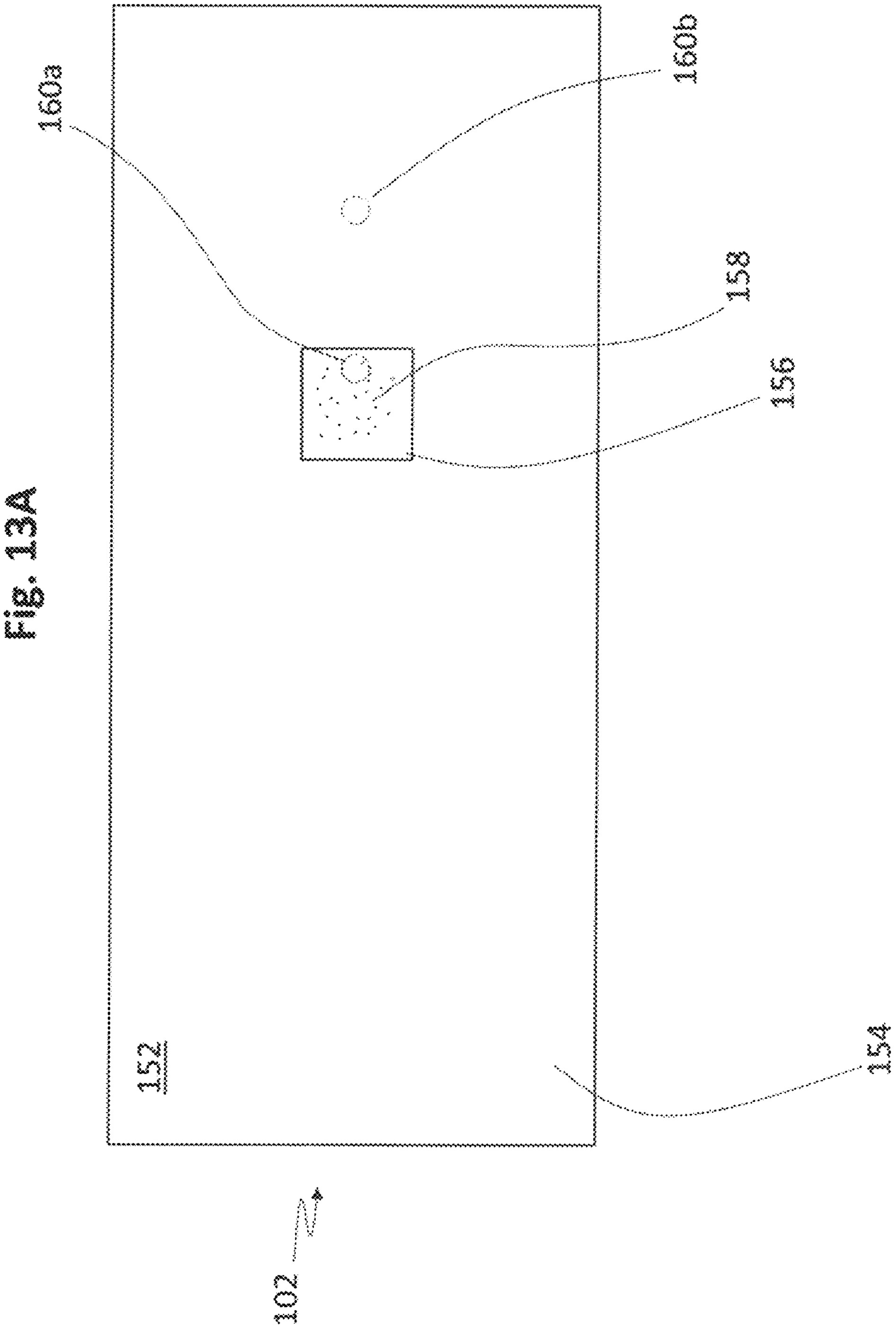
FIGS. 13A, 13B, 13C, 13D, 13E, 13F, 13G, 13H, 13I, and 13J are drawings depicting another exemplary method of separating magnetically responsive particles from a polar liquid droplet in an EWOD device.
Figure 13B:
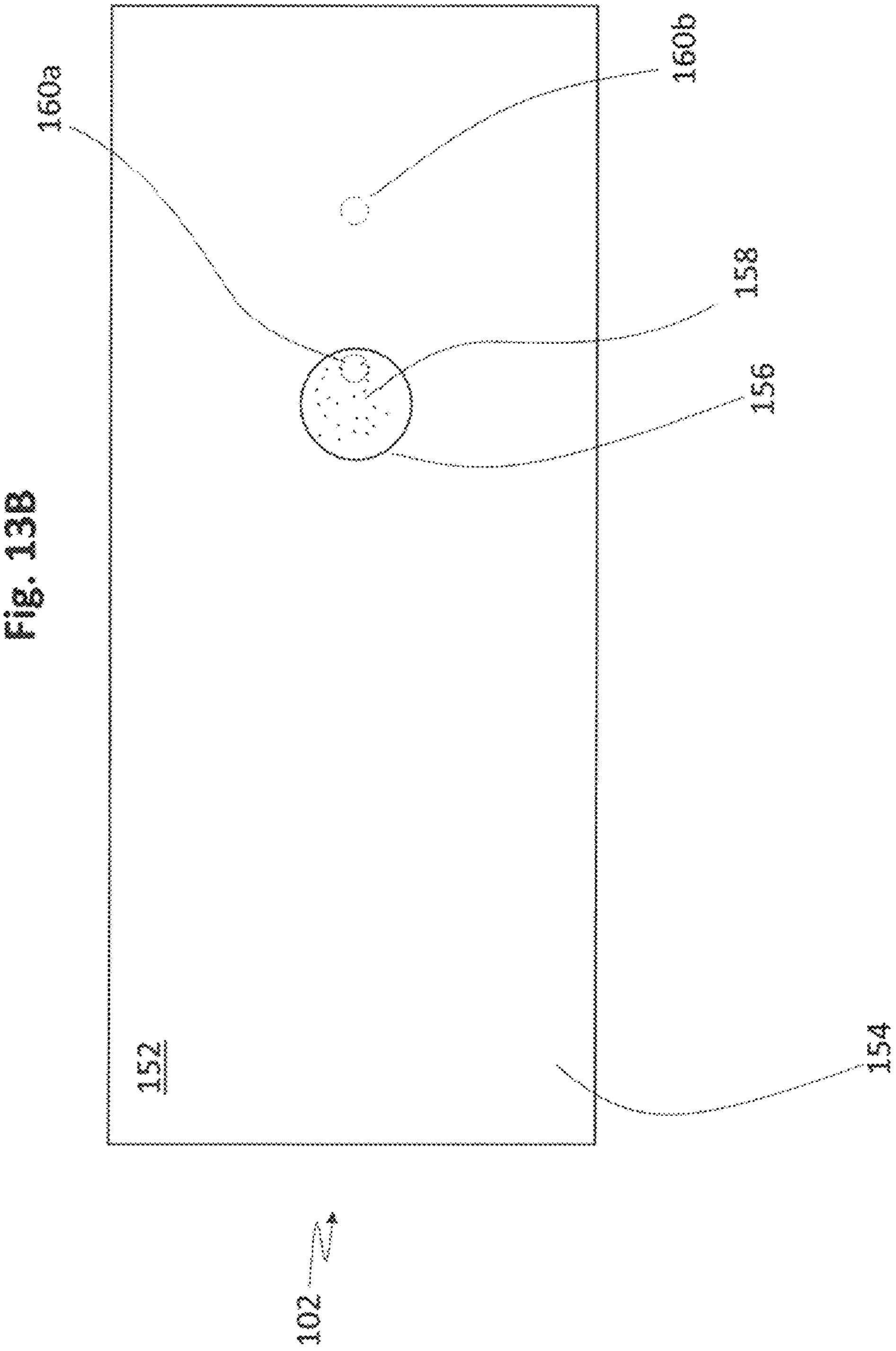

FIGS. 13A-13J are drawings depicting another exemplary method of separating magnetically responsive particles from a polar liquid droplet in an EWOD device. The current embodiment also may be performed on an EWOD device element array comparably as the previous embodiment. Similarly as above, FIG. 13A depicts a droplet of polar fluid 156 within which is distributed a plurality of magnetically responsive particles 158. The droplet 156 is moved under influence of electrowetting activation to a desired initial location within reaction chamber 152 of microfluidic cartridge 102. The droplet thus retains a nominal square profile while under influence of electrowetting activation as referenced above. This embodiment employs two magnet elements 160, labeled 160*a* and 160*b* in these figures. In the initial state of FIG. 13A, the magnet elements are both in the withdrawn position (or off state) as indicated by the open circles so as not to apply an operative magnetic field. The droplet of polar fluid 156 is initially moved by electrowetting actuation to a location within reaction chamber 152 beneath which is located a first magnetic element 160*a*. As shown in FIG. 13B, when the electrowetting force is removed by de-actuating the array elements, the droplet 156 returns to the nominal circular shape.

Figure 13C:
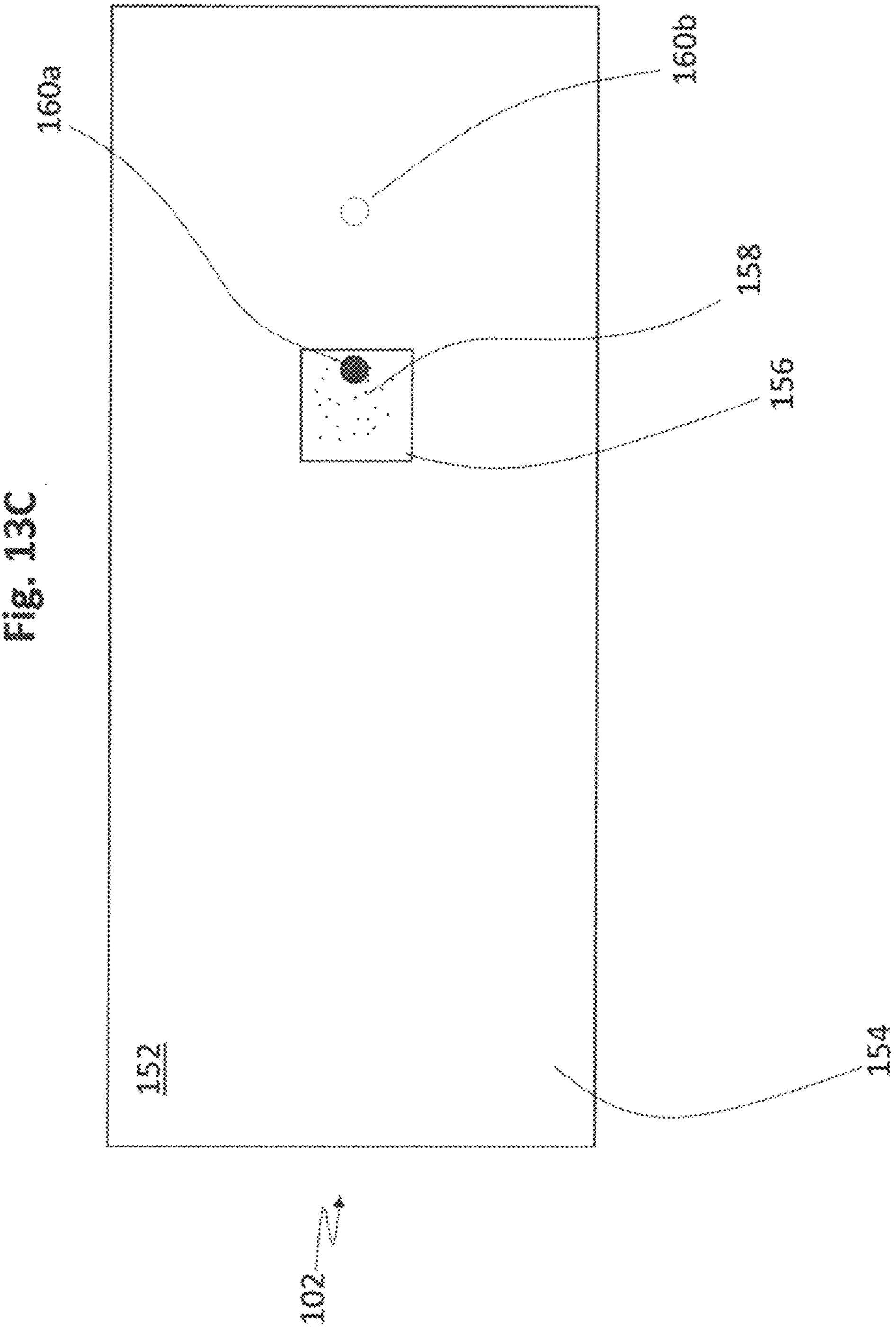
Figure 13D:
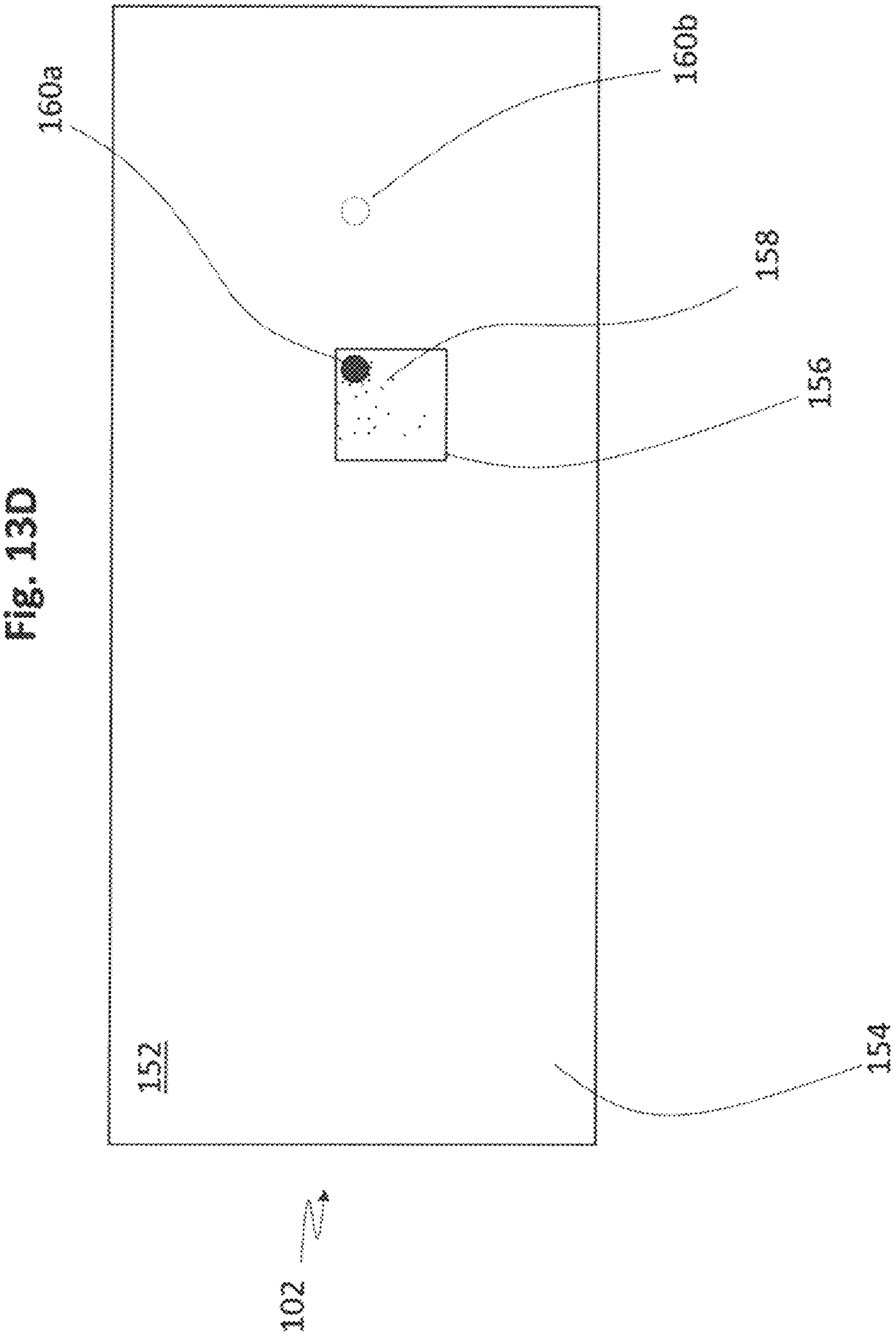
Figure 13E:
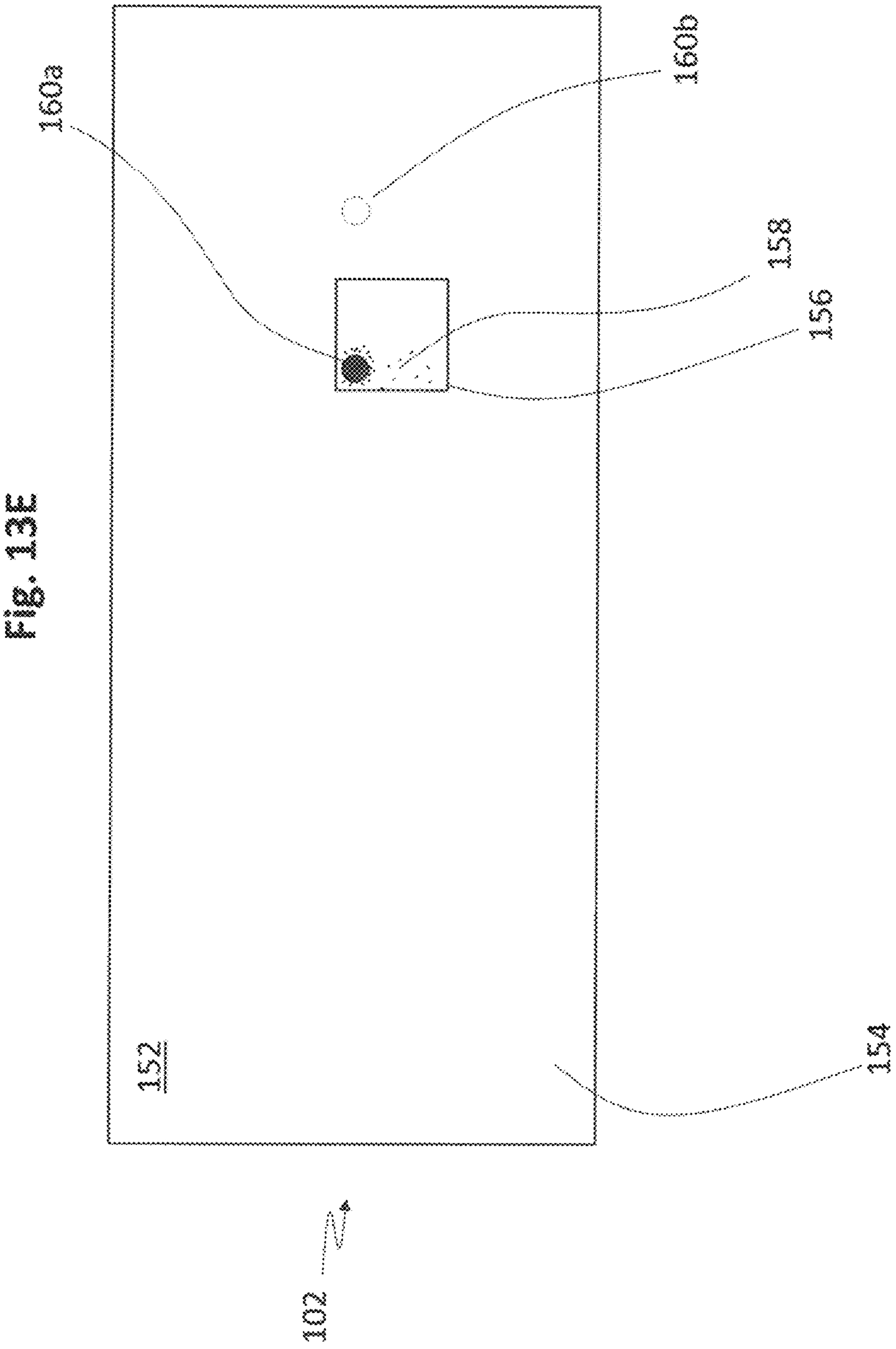
Figure 13F:
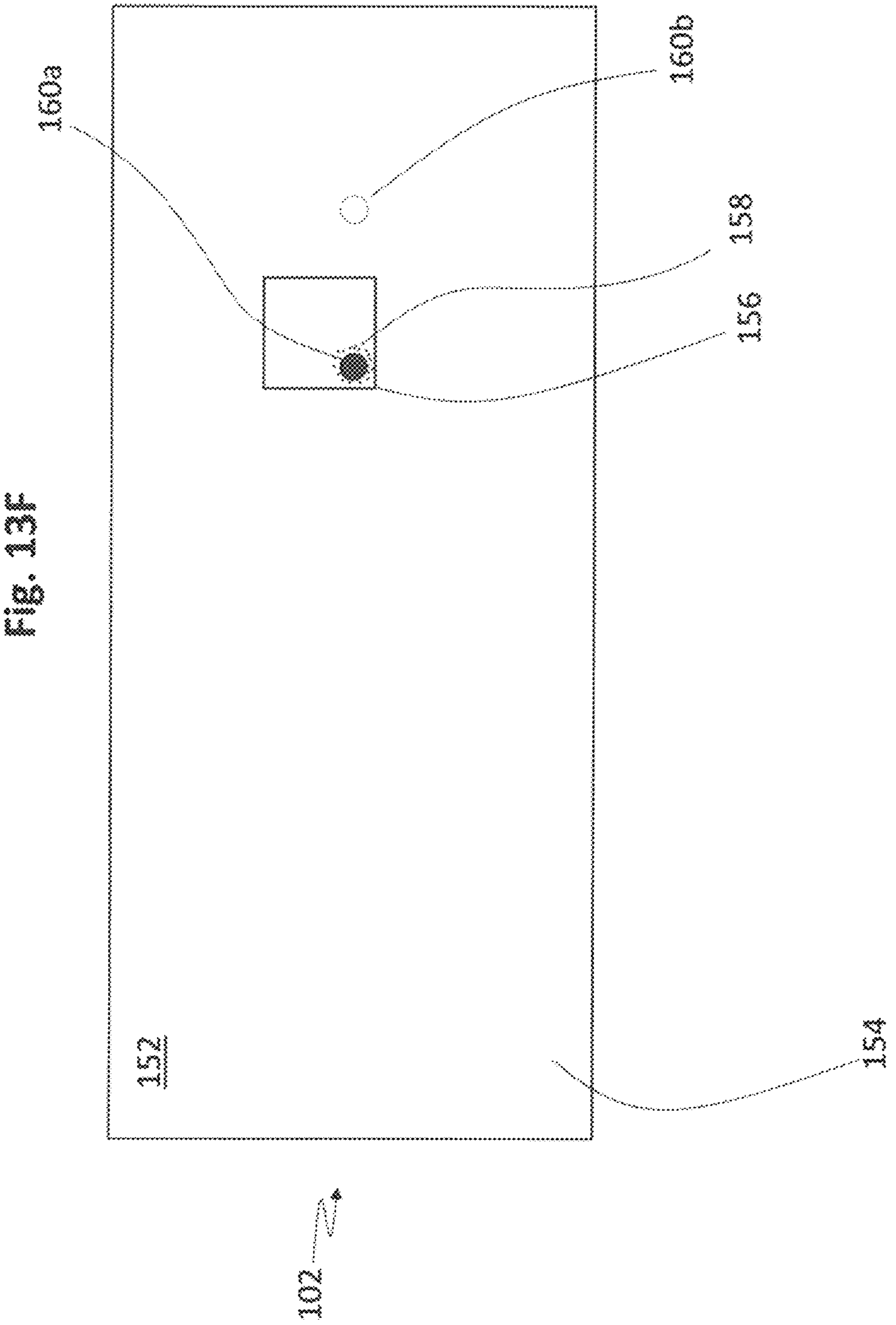
Figure 13G:
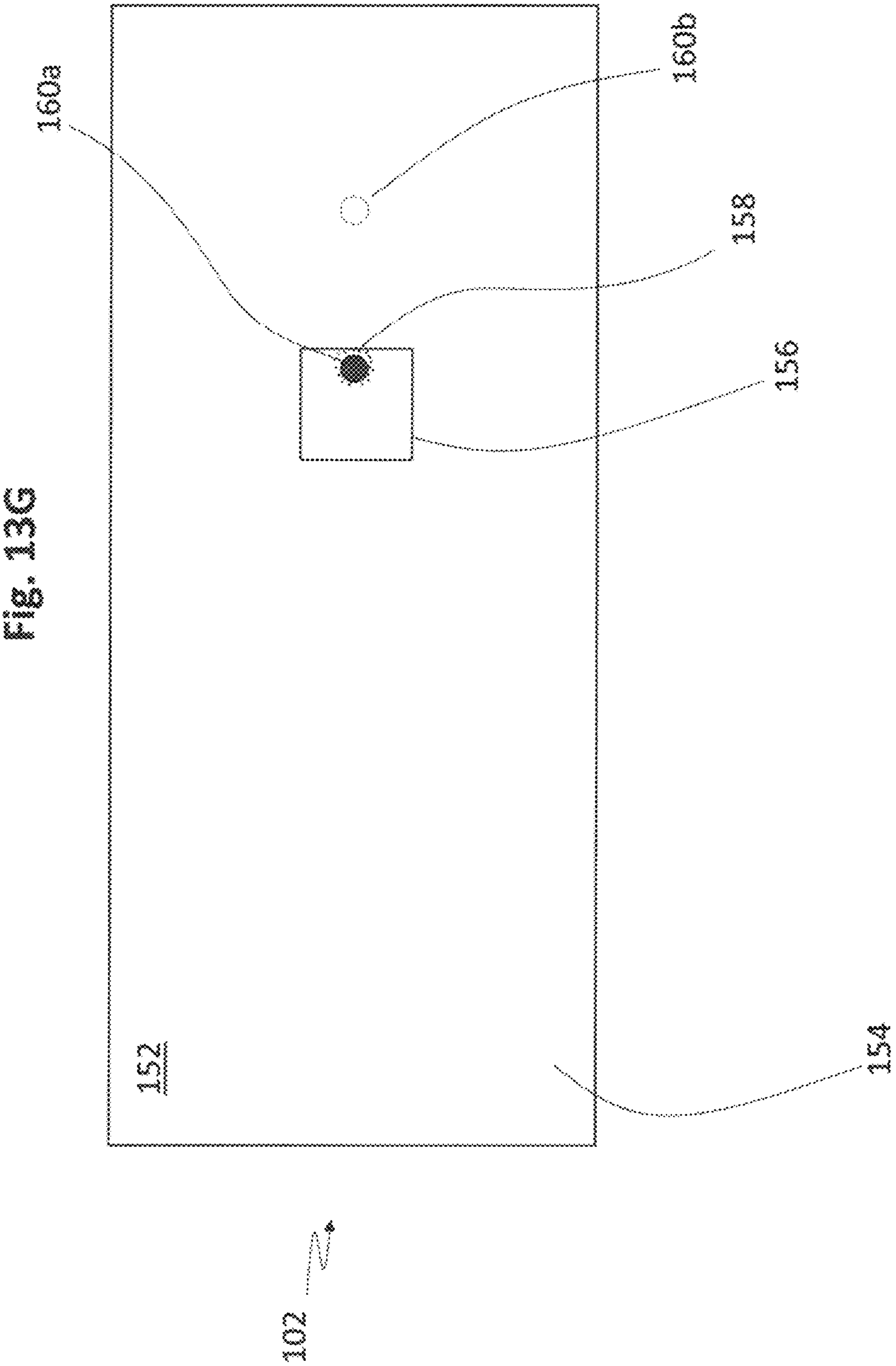

The first magnet element 160*a* may be employed to aid in aggregating the magnetically responsive particles 158 within the droplet 156. As shown in FIG. 13C, the first magnet element 160*a* is then elevated (solid circle) to thereby cause aggregation of magnetically responsive particles 158 toward a common location point within the droplet of polar fluid 156. To enhance the accumulation of essentially all of the magnetically responsive particles 158, while the first magnet element 160*a* is in an elevated position, electrowetting actuation of the droplet of polar fluid may be applied. As shown in FIGS. 13D-13G, electrowetting forces may be employed to cause the droplet 156 to move around relative to the location of first magnet element 160*a*, whereby specific portions of the droplet 156 sequentially pass above the magnet element 160*a*. In this manner, the magnetically responsive particles 158 throughout the droplet 156 successively aggregate about the position of the first magnet element 160*a* as the droplet 156 is moved around. This process can be thought of as the magnetically responsive particles 158 being "swept up" into an aggregation with movement of the droplet 156 about the location of the first magnet element 160*a*.

Figure 13H:
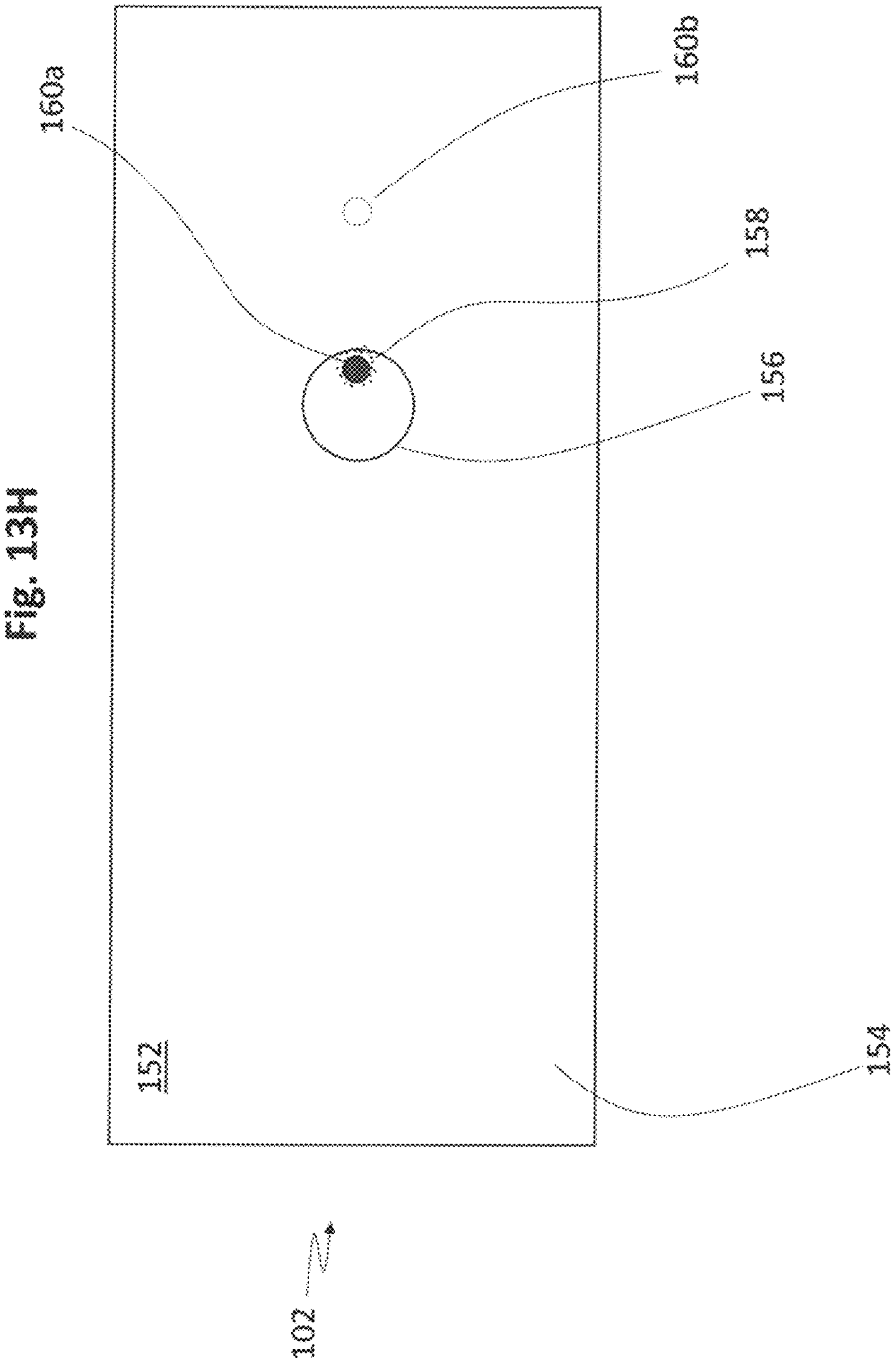
Figure 13I:
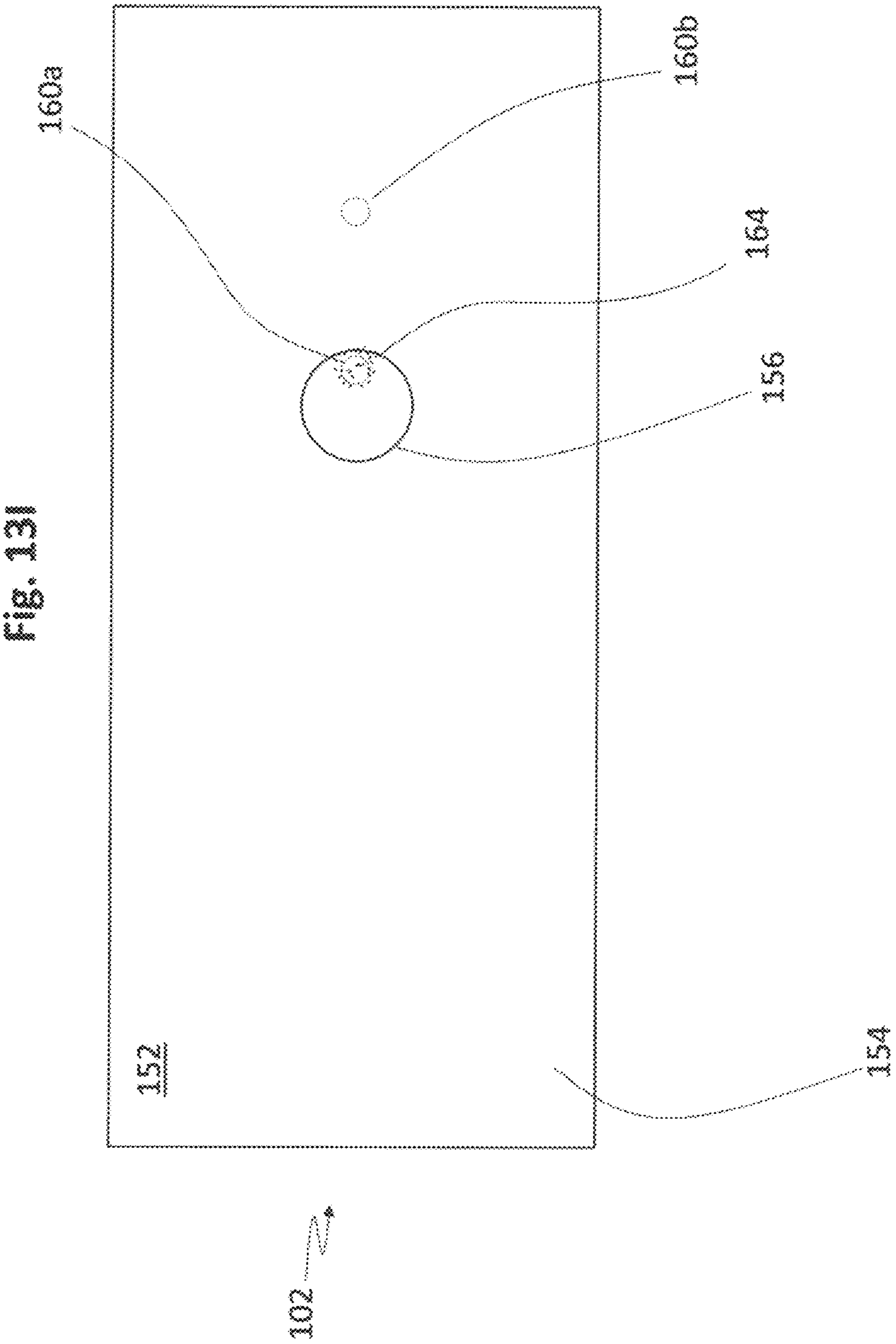

As shown in FIG. 13H, while first magnet element 160*a* remains is an elevated position, the electrowetting actuation of the droplet of polar fluid 156 is removed, and the droplet 156 resumes the nominally circular shape. As shown in FIG. 13I, the first magnet element 160*a* is then moved to a lower position relative to the microfluidic cartridge 102, such that the first magnet element 160*a* no longer asserts any consequential magnetic influence over the magnetically responsive particles 158. Such particles are now accumulated into the aggregation 164 similarly as in the previous embodiment.

Figure 13J:
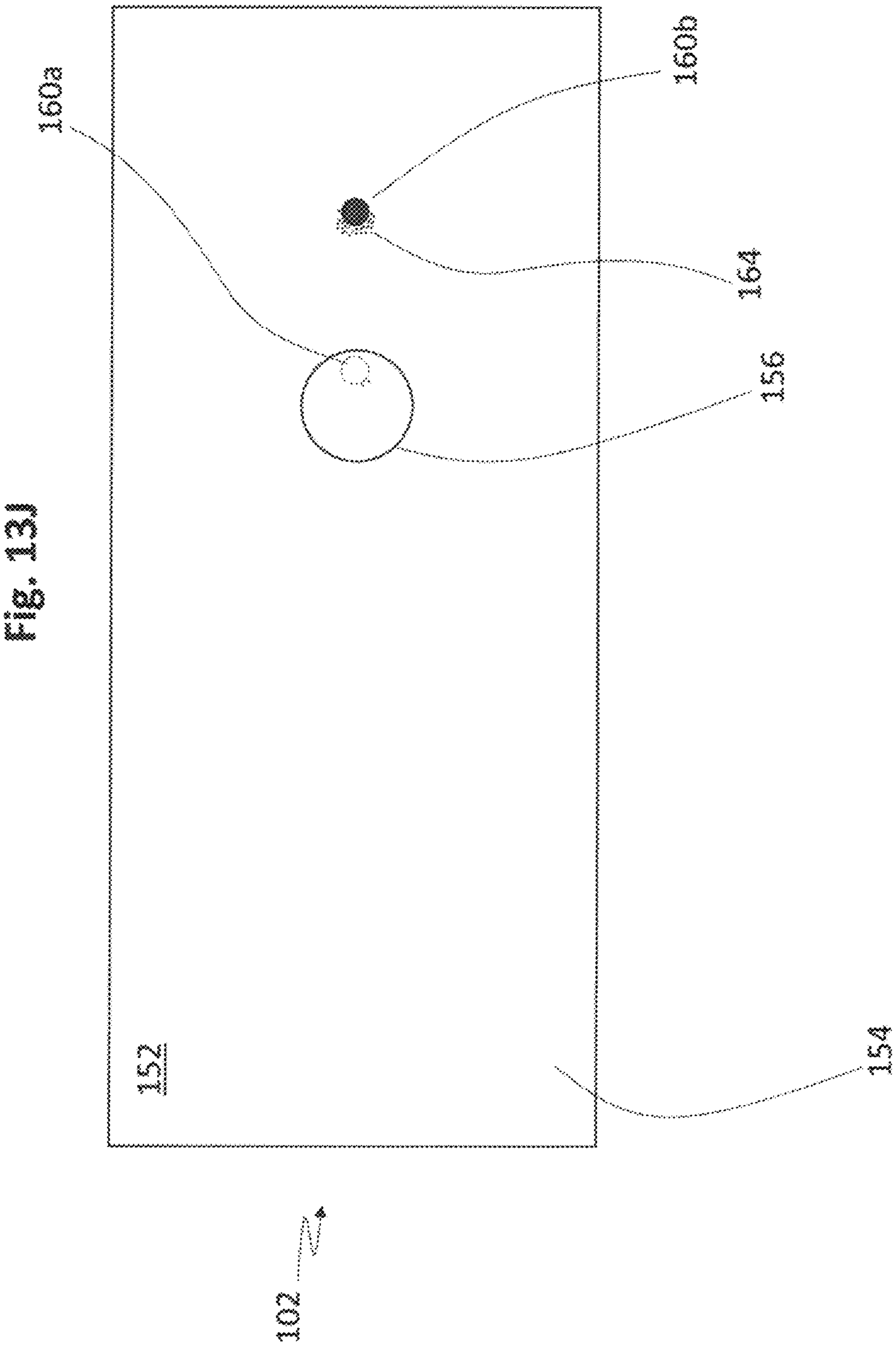

As shown in FIG. 13J, next the second magnet element 160*b* is moved into an elevated position such that the aggregated magnetically responsive particles 158 accumulated into the aggregation 164 are caused to jump through the meniscus of polar droplet 156 to the location in proximity to the second magnet element 160*b* under the influence of the magnetic field generated by second magnet element 160*b*. Because the magnetically responsive particles 158 have been pre-aggregated by the first magnet element 160*a* using the electrowetting operation on the droplet 156, the result of the operation of the second magnet element 160*b* is to move essentially all of the magnetically responsive particles 158 toward the location of second magnetic element 160*b*. Unlike the previous embodiment, therefore, there typically is needed only a single transfer event due to the pre-aggregation of magnetically responsive particles 158, rather than the successive iterations described above with respect to the previous embodiment.

Figure 14A:
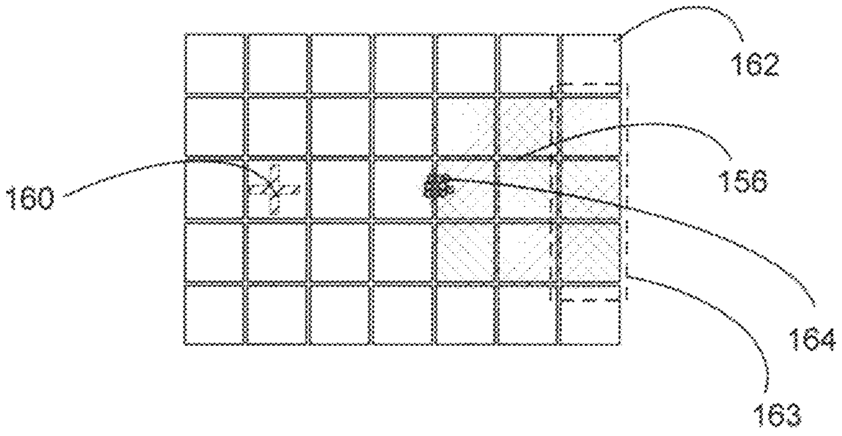
FIGS. 14A, 14B, and 14C are drawings depicting another exemplary method of separating magnetically responsive particles from a polar liquid droplet in an EWOD device.
Figure 14B:
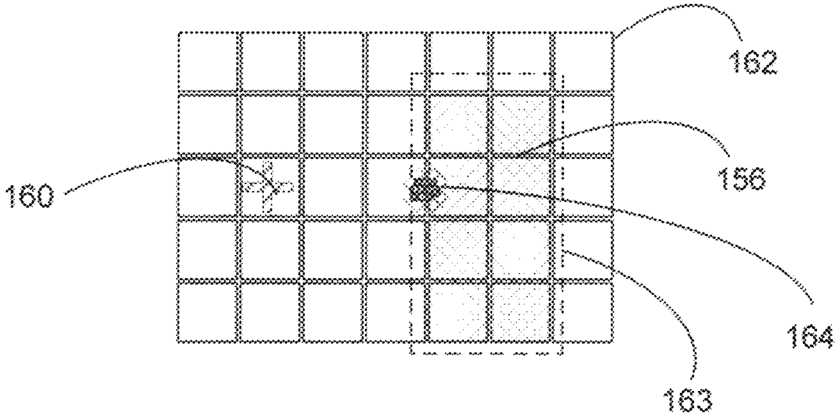
Figure 14C:
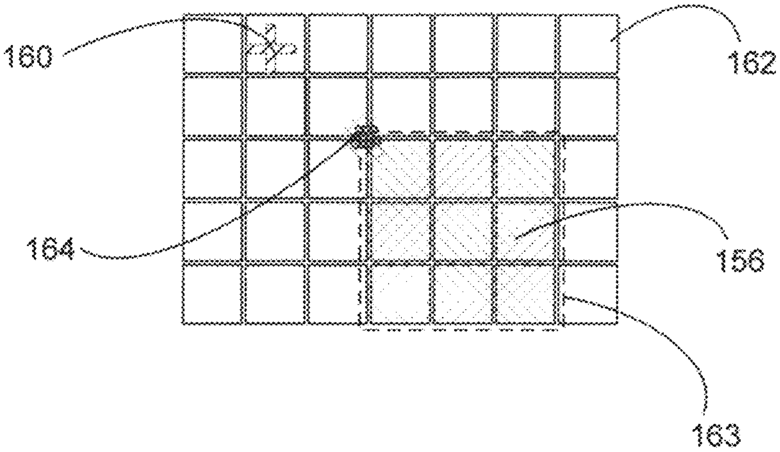

FIGS. 14A-14C are drawings depicting a variation on the process of FIGS. 13A-13J, and illustrating such variation along the EWOD device array 162. Actuated electrodes are indicated by the dashed outline 163 in these figures. In this embodiment, the polar droplet 156 may be moved by electrowetting actuation so as to aggregate the magnetically responsive particles in an aggregation 164 located at a corner of the actuated droplet 156, with the droplet 156 being positioned by the electrowetting forces with such corner oriented closest to the magnet element 160. The aggregation 164 of the magnetically responsive particles can then transfer to the magnet element 160 in a single transfer event comparably as described above.

Figure 15A:
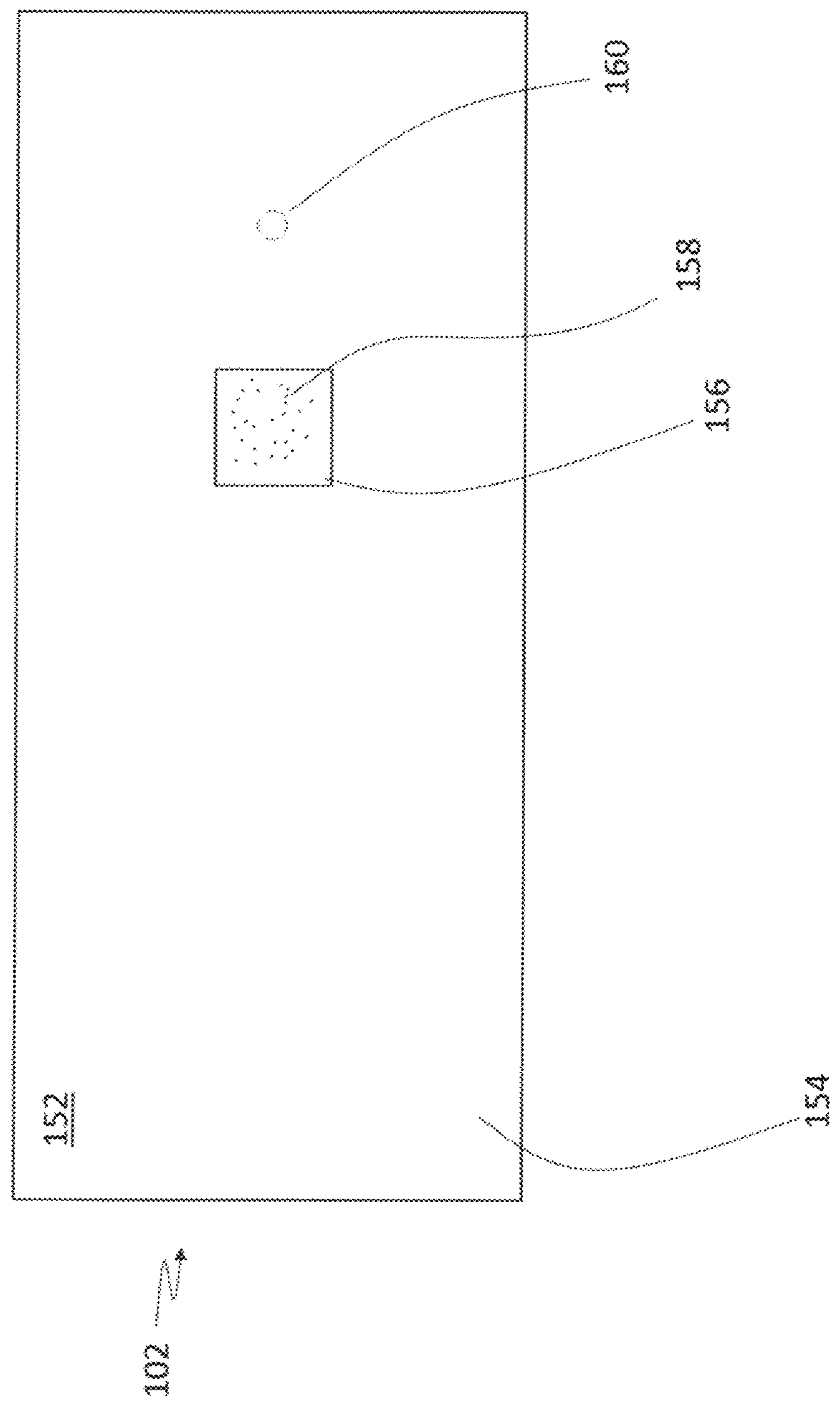
FIGS. 15A, 15B, and 15C are drawings depicting another exemplary method of separating magnetically responsive particles from a polar liquid droplet in an EWOD device.
Figure 15B:
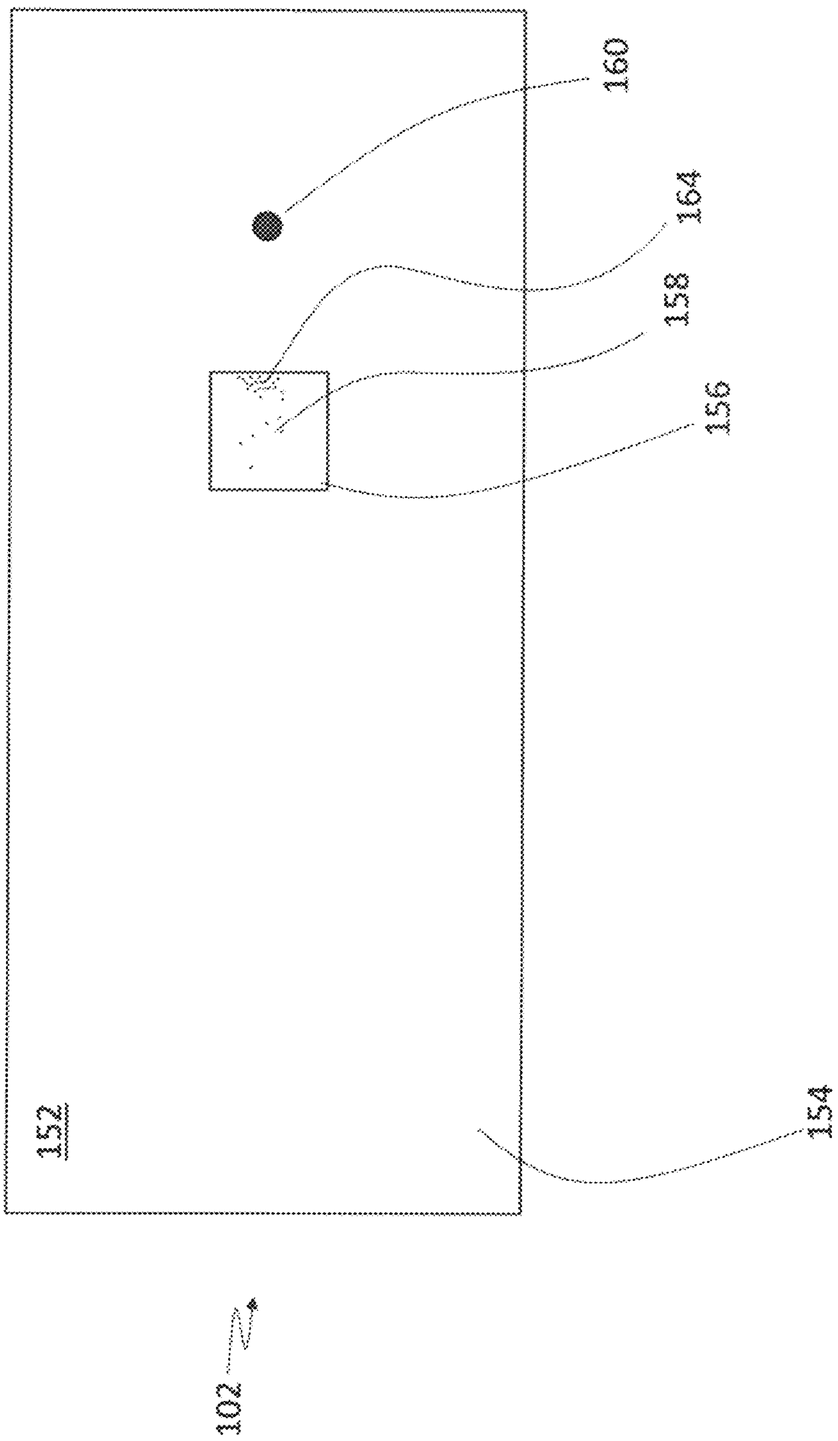
Figure 15C:
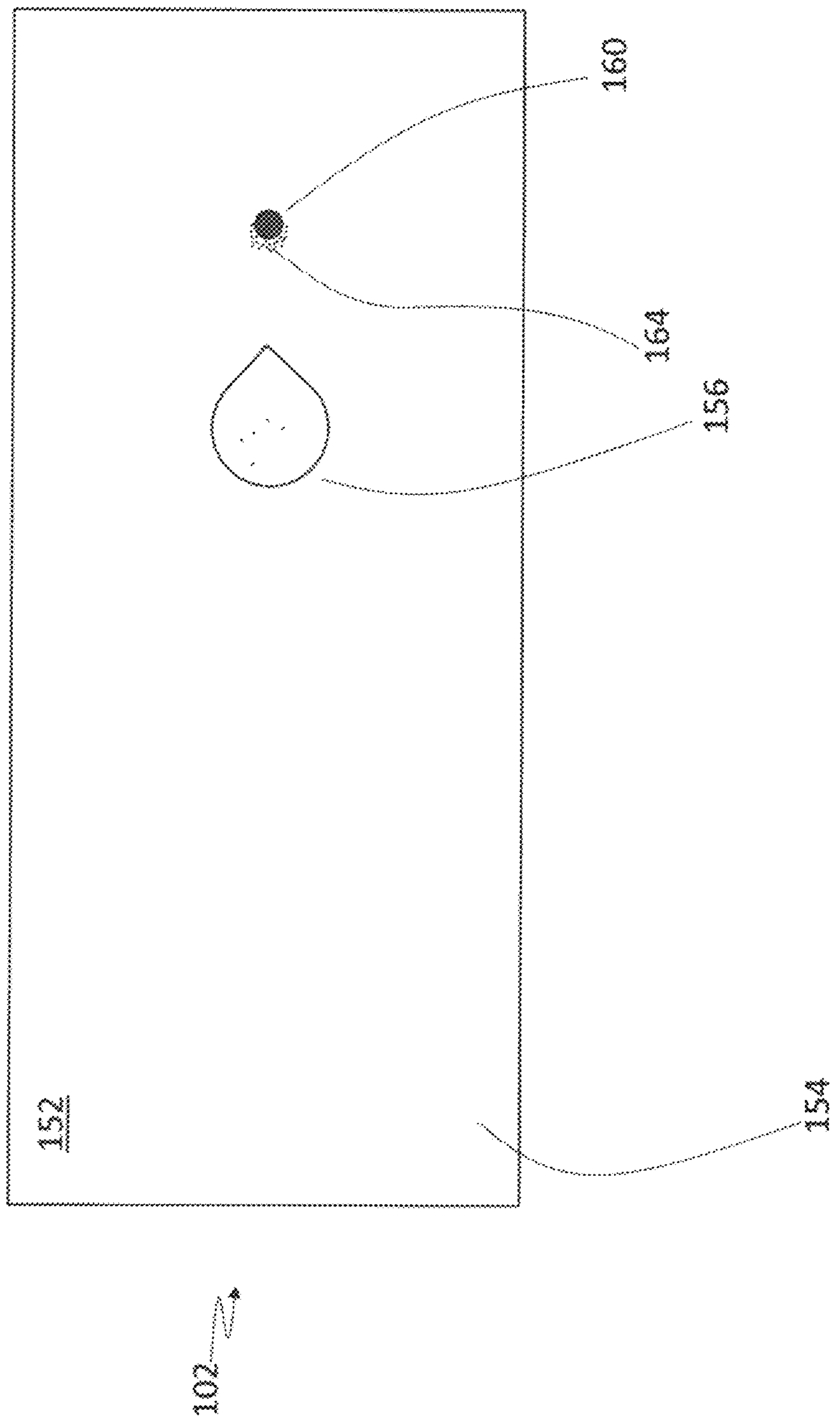

FIGS. 15A-15C are drawings depicting another exemplary method of separating magnetically responsive particles from a polar liquid droplet in an EWOD device. Such embodiment also may be performed on an EWOD device element array comparably as the previous embodiments. In this embodiment, as illustrated in FIG. 15A, unlike as described with respect to previous embodiments, the electrowetting actuation of the droplet of polar fluid 156 initially is maintained, which maintains the nominally square shape of an actuated droplet. As illustrated in the figure, the actuated polar droplet 156, with a square edge profile, is oriented with a straight edge nearest to the magnet element 160, and at a distance from the magnet element comparably as in previous embodiments. (A "straight edge" in this context means a region where the contact line (meniscus) forms a straight line. This is achieved when the actuation pattern applied in this region comprises two or more array elements in a line that are actuated, adjacent to two or more array elements that are unactuated. The electro-wetting effect thus causes the contact line (the droplet edge) to follow the straight line boundary between the actuated and unactuated elements. A region of the droplet having a non-straight edge (for example, a curvature of the contact line/meniscus, a corner or a point) may be achieved by actuating elements in a pattern other than a straight line, for example to form a square edge, or triangular edge. Again, the electrowetting effect may be used to control the geometry of the meniscus by setting the local surface tension at regions of the contact line.)

As shown in FIG. 15B, with such orientation, when magnet element 160 is moved to the elevated position, the magnetically responsive particles 158 begin to accumulate in an aggregation 164 along the edge of the droplet 156 closest to the location of magnet element 160, similarly as in the previous embodiment. Under circumstances of FIG. 15B, in contrast, as an increasing number of magnetically responsive particles 158 accumulate along the edge of the droplet of polar fluid 156, they do not cause any significant distortion to the meniscus of the edge of droplet of polar fluid 156 that is closest to the location of magnet element 160. For example, there may be an insufficient number of magnetically responsive particles 158 to break through the surface tension of the straight edge of the actuated polar droplet 156. The effect of the magnetic field on the accumulated magnetically responsive particles 158 in the aggregation 164 is thus insufficient to break through the straight edge meniscus of the electrowetting actuated polar droplet 156. The magnetic field in this example also is unable to pull the entire droplet 156 towards the location of magnet element 160 because the electrowetting forces predominate, holding the droplet 156 in the current location to which the droplet initially is located. In such an embodiment, the system may be operated to "pool" or aggregate the magnetically responsive particles 158 within a selected region of the polar droplet 156, without actually to separating the magnetically responsive particles 158 from the droplet 156.

There may come a time when removal of the magnetically responsive particles 158 from the polar droplet 156 becomes desirable. As shown in FIG. 15C, on removal of the electrowetting activation from droplet of polar fluid 156, the aggregated magnetically responsive particles 164 immediately break through the meniscus between non-polar fluid 154 and the polar droplet 156 as the droplet 156 reverts back to the nominal circular shape. With such reversion to circular shape, the surface tension at the edge of the polar droplet reduces as compared to the surface tension associated with the previous straight edge. As a result, the aggregation 164 of magnetically responsive particles 158 transfers "en masse" towards the location in proximity to magnet element 160. Unlike the embodiment described with respect to FIGS. 12A-12E, the prolonged accumulation interval afforded by the presence of the active electrowetting force applied to polar droplet 156 may result in a greater overall percentage of magnetically responsive particles 158 being aggregated at the straight edge. When transfer occurs upon removal of the electrowetting forces, essentially all the magnetically responsive particles transfer from the polar droplet 156 into the non-polar fluid 154 directly above the location of magnetic element 160 in a single transfer event. This embodiment, therefore, also may render unnecessary multiple successive or iterative transfer events that may be required when no electrowetting activation is applied to a polar droplet 156 when the magnet element 160 is brought in proximity with the microfluidic cartridge.

Figure 16A:
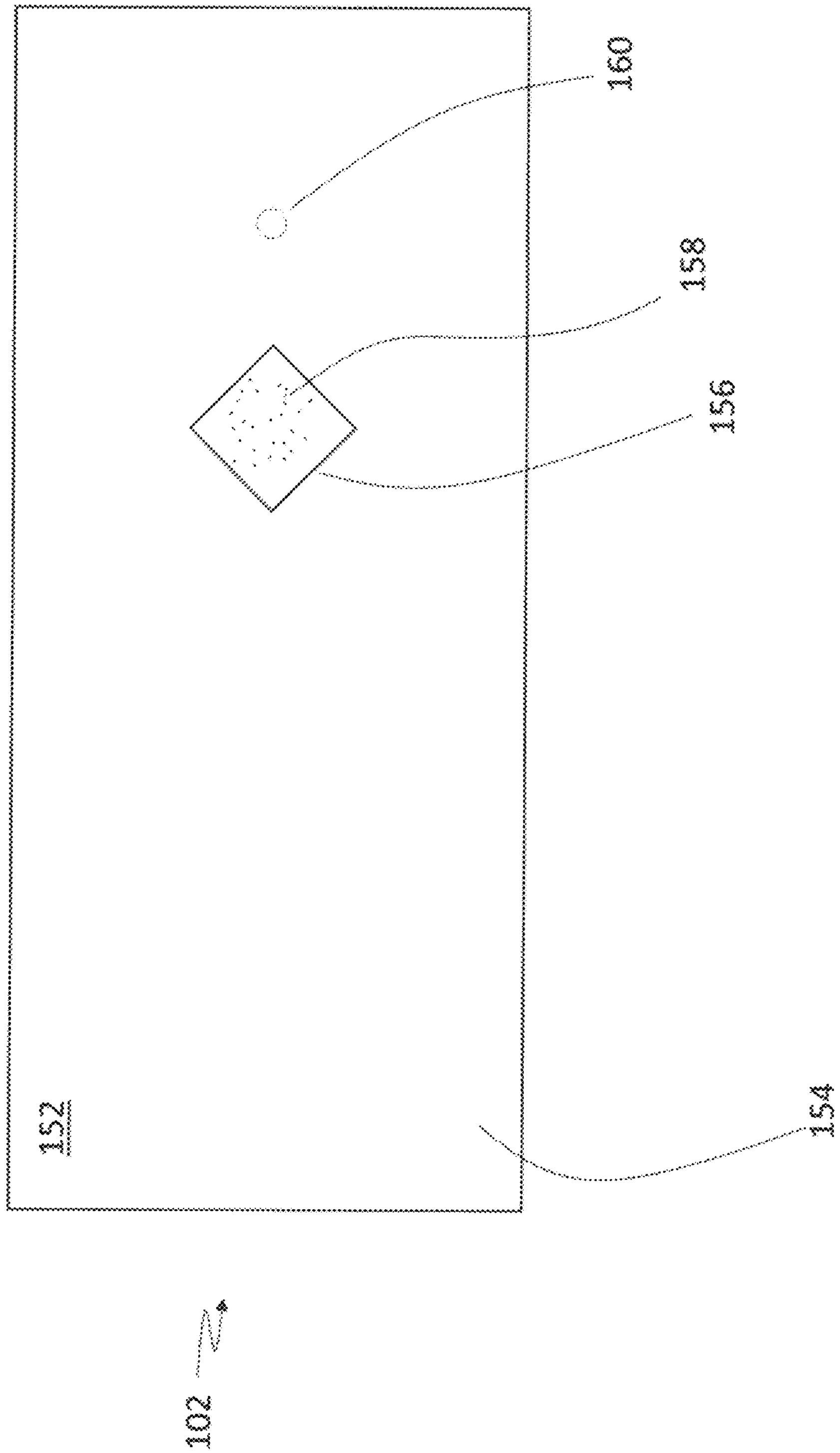
FIGS. 16A, 16B, and 16C are drawings depicting another exemplary method of separating magnetically responsive particles from a polar liquid droplet in an EWOD device.
Figure 16B:
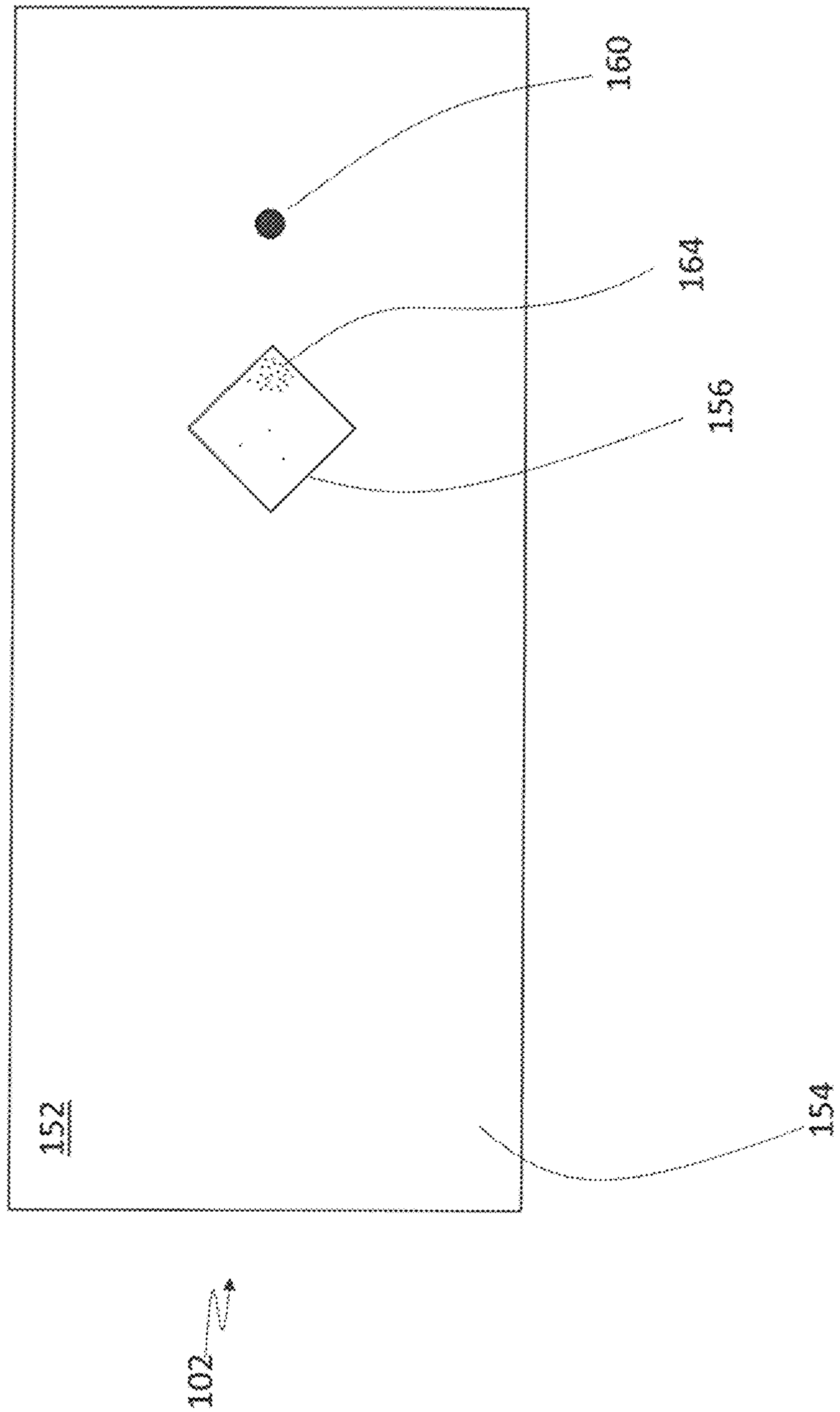
Figure 16C:
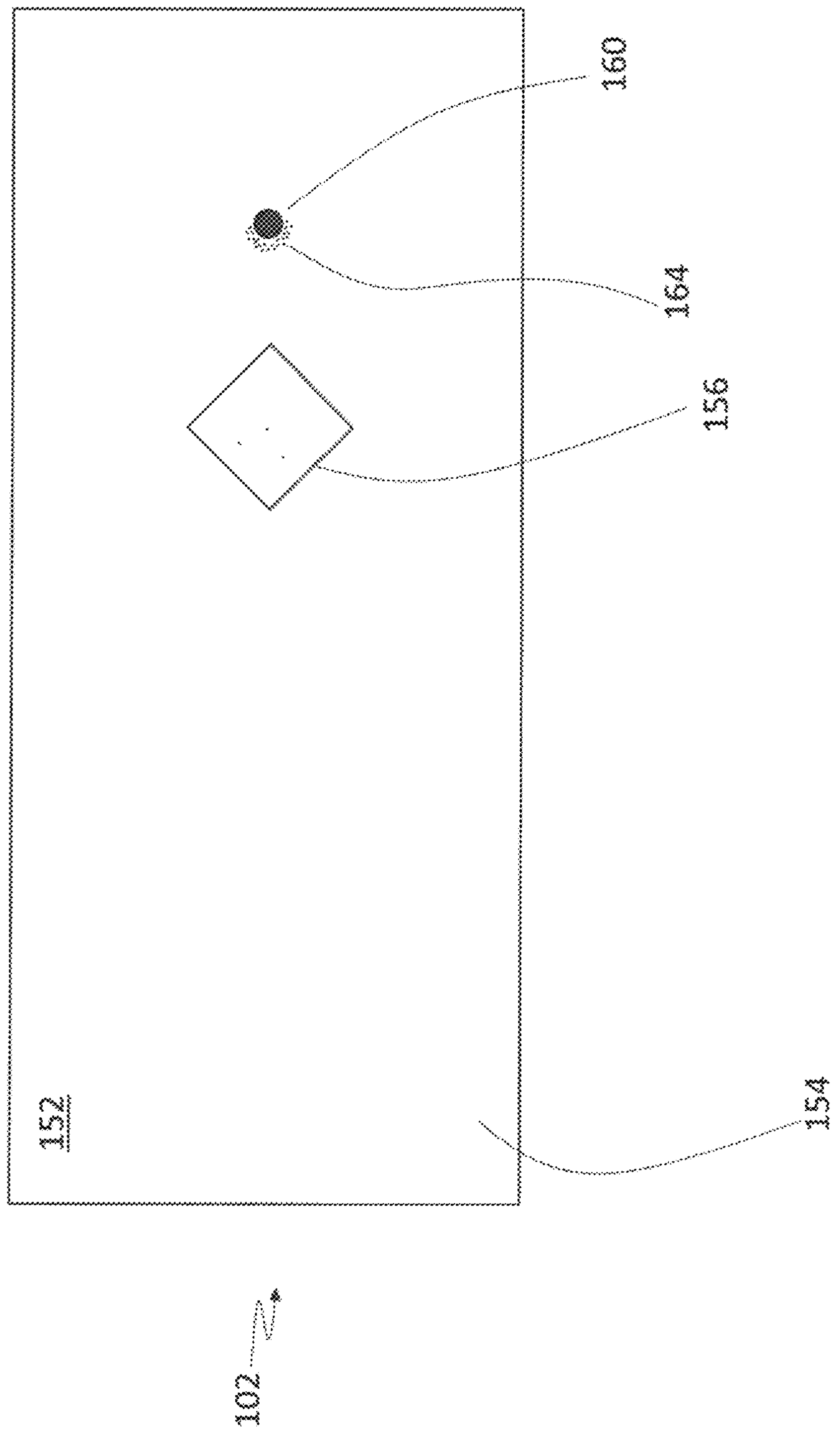

FIGS. 16A-16C are drawings depicting another exemplary method of separating magnetically responsive particles from a polar liquid droplet in an EWOD device. Such embodiment also may be performed on an EWOD device element array comparably as the previous embodiments. As shown in FIG. 16A, in this embodiment a droplet of polar fluid 156 is formed having a diamond shaped profile under electrowetting actuation. Such a diamond shaped droplet is manipulated by the electrowetting forces to be located with a point of the diamond oriented toward the location of magnet element 160, and at a distance from the magnet element comparably as in previous embodiments. The electrowetting actuation is maintained so as to maintain the diamond shape. In the state of FIG. 16A, the magnet element 160 is in the withdrawn position or off state (open circle).

As shown in FIG. 16B, when magnet element 160 is moved to the elevated position (solid circle) to be in proximity with the microfluidic cartridge 102, the magnetically responsive particles 158 initially began to accumulate in an aggregation 164 located at the pointed corner of polar droplet 156 closest to the location of magnet element 160. As shown in FIG. 16C, because of the formation of the diamond corner, unlike the embodiment of FIG. 15B in which the magnetically responsive particles 158 are unable to break through the meniscus between non-polar fluid 154 and the polar droplet 156, when a sufficient number of magnetically responsive particles 158 have accumulated into the aggregation 164, the magnetic field strength of magnet element 160 is sufficient to pull the aggregated magnetically responsive particles 164 through the meniscus of the electrowetting actuated diamond shaped polar droplet 156 to a location in proximity to the location of magnet element 160.

In accordance with such principles, any suitably shaped droplet profile may be formed using electrowetting actuation according to the specific requirements of an assay or reaction protocol being performed. Generally, it is observed that droplet profiles that present a straight edge toward the location of magnet element 160 while actuated result in an accumulation of magnetically responsive particles 158 along the meniscus of droplet of polar fluid 156 closest to the location of magnet element 160 when magnet element is raised into elevated position. With such straight edge orientation toward the magnet element, the magnetically responsive particles 158 typically are unable to overcome the droplet surface tension, and thus are unable to break through the straight edge of an actuated polar droplet 156. This process can be used to perform a prolonged aggregation step to increase the proportion of aggregated magnetically responsive particles. On the other hand, when a droplet of polar fluid 156 is actuated by the electrowetting forces to have a non-straight edge, such as a corner or point, oriented toward the magnet element, then the magnetically responsive particles 158 typically may accumulate and subsequently break through the surface tension of polar droplet 156 at the non-straight edge. Thus, the magnetically responsive particles may be removed through the point or corner of droplet 156 and locate in an aggregation over the location of magnet element 160.

Furthermore, when the population of magnetically responsive particles 158 within a droplet of polar fluid 156 is below a sufficient number, when such a droplet is located at a defined distance from a magnet element 160 in the absence of electrowetting actuation, the magnetically responsive particles 158 initially accumulate along the edge of the droplet closest to the location of magnetic element 160. With such insufficient number, the mass of magnetically responsive particles is insufficient to break through the meniscus to escape droplet of polar fluid 156. Rather, in such circumstances, the magnetic field effect on the accumulated magnetically responsive particles may be such that rather than breaking through the meniscus, the entire droplet of polar fluid 156 is pulled through non-polar fluid 154 toward the location of magnet element 160.

The processes described above may be employed in connection with sensing structures to enhance the separation of the magnetically responsive particles with the magnet elements. Such sensing structures and methods are described in Applicant's U.S. application Ser. No. 16/298,063 filed on Mar. 11, 2019, the contents of which are incorporated herein by reference. Sensing may sense the location of a droplet of polar fluid 156 and/or magnetic element 160 relative to reaction chamber 152. The microprocessor within the EWOD control system may therefore be programmed to detect and therefore accurately position the polar droplets 156 at any spatial location within reaction chamber 152 by electrowetting operations. The system is thus capable of ensuring droplets of polar fluid 156 are moved to a defined distance both horizontally (x) and vertically (y) within reaction chamber 152 relative to the location of magnet element 160, such that processes performed within different devices can occur with a high degree of reproducibility.

The system also may use real-time sensor feedback regarding the position of a droplet of polar fluid 156 relative to magnet element 160. As described above, under certain circumstances, typically when the number of magnetically responsive particles 158 within a droplet of polar fluid 156 has been reduced following removal of a portion thereof, the entire droplet may begin to be dragged toward the location of magnet element 160. There is a need to prevent the separated magnetically responsive particles 158 from being returned into the droplet of polar fluid 156 from which they were removed. To accomplish such result, when the sensor feedback indicates a droplet of polar fluid 156 is approaching the location of the excised magnetically responsive particles 158, the system may be programmed to either lower magnet element 160, thereby removing the magnetic field and thus preventing further dragging of the droplet, and/or electrowetting actuation may be applied to move the droplet of polar fluid 156 to a location at which the magnetic field has a negligible effect. The position of the magnet element 160 relative to the electrowetting array also may be determined by the sensor structures, as also described in the '063 application.

Another co-owned application of the Applicant is U.S. Publication No. 2018/0284423, which describes a method of controlling the spatial position of a droplet within an EWOD device, through use of selective application of electrowetting activation in combination with sensor feedback. When a droplet that is not actively under electrowetting control has moved beyond a predefined distance from a location within the reaction chamber 152, sensor feedback causes the system to apply electrowetting activation to reposition the droplet to the desired location, before electrowetting actuation is again removed.

Figure 17:
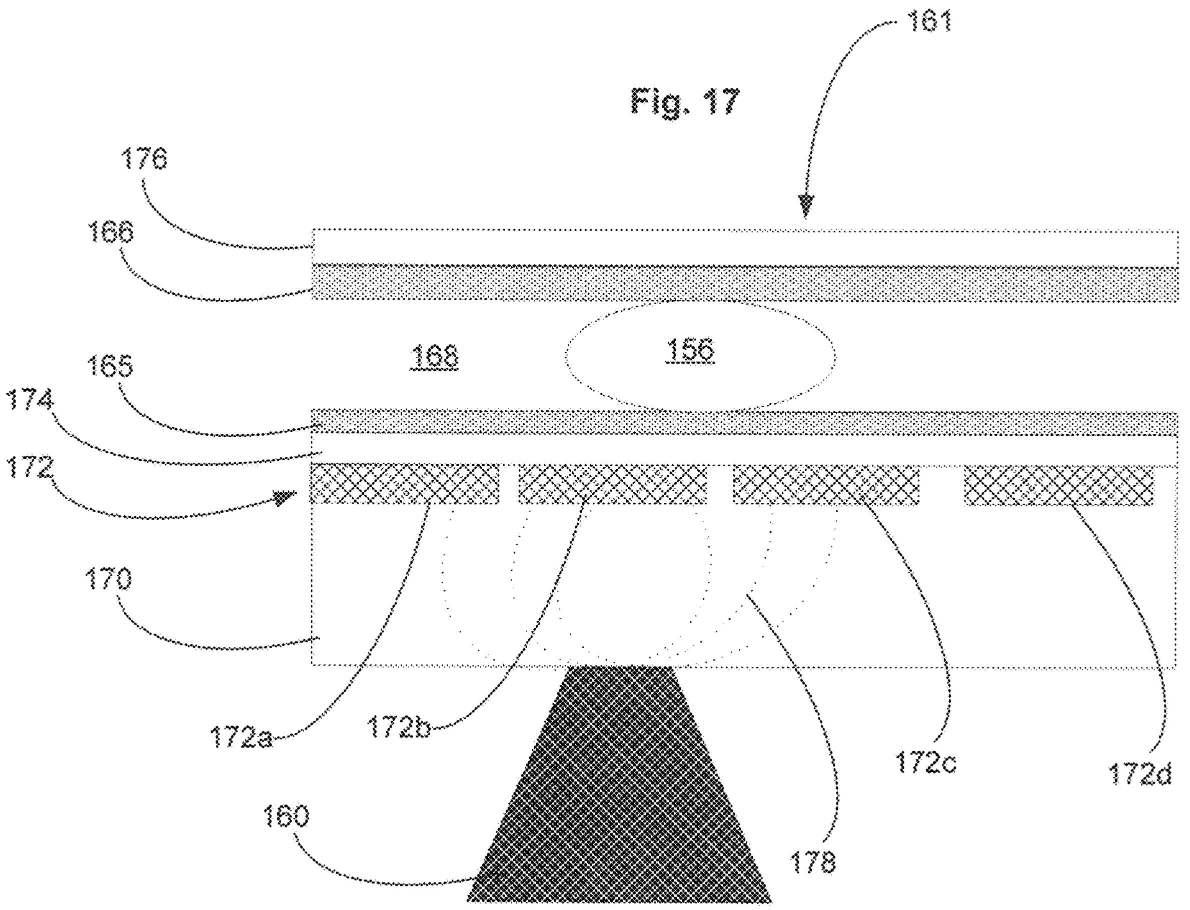
FIG. 17 is a drawing depicting an exemplary portion of an AM-EWOD cartridge in relation to a magnet element of a microfluidic instrument.
Figure 18:
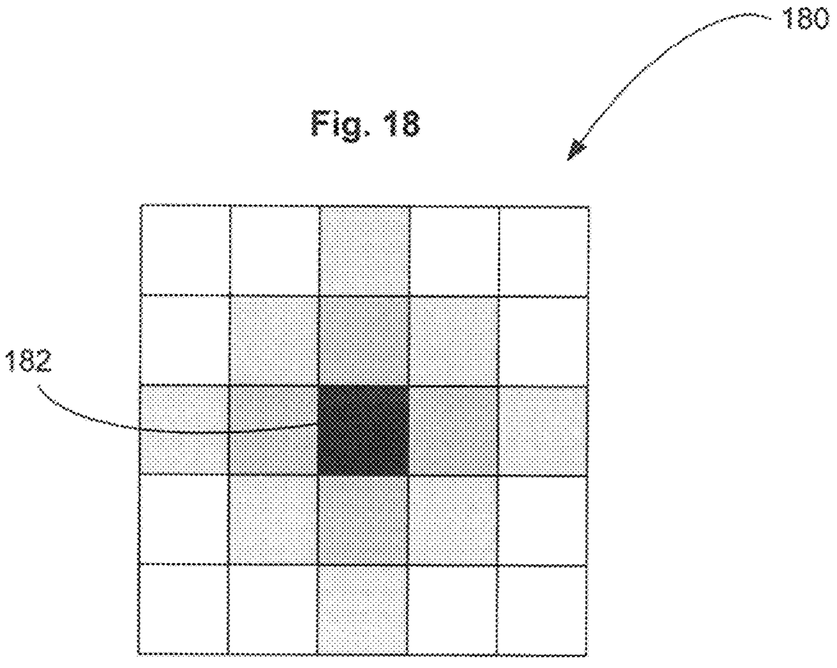
FIG. 18 is a drawing depicting an output image that is derived from output currents measured from an element array when a voltage perturbation is applied to a magnet element for sensing the magnet element position.

As an example of sensor operation, FIG. 17 is a drawing depicting an exemplary portion of an AM-EWOD cartridge in relation to a magnet element of a microfluidic instrument. FIG. 18 is a drawing depicting an output image that is derived from output currents measured from an element array when a voltage perturbation is applied to the magnet element. Specifically, FIG. 17 depicts an exemplary portion of an AM-EWOD cartridge 161 in relation to a magnet element 160 of a microfluidic instrument. Similarly, as described above in connection with other figures, the microfluidic cartridge 161 includes a first hydrophobic coating 165 and a second hydrophobic coating 166 that define a channel 168 into which liquid droplets 156 and a filler fluid (e.g., oil) may be dispensed. The cartridge 161 further may include a TFT glass substrate 170 onto which there is patterned an array of element electrodes 172. Four element electrodes 172*a-d* are shown in this example, although comparable principles apply to any size electrode array. The element electrodes 172*a-d* are spaced apart from the first hydrophobic coating 165 by an ion barrier 174, and a reference electrode 176 may be deposited on the second hydrophobic coating 166 opposite from the channel 168.

FIG. 17 depicts a state in which a voltage is applied to the magnet element 160, which is conductive. The voltage perturbation applied to the magnet element 160 couples to the electrode array 172 capacitively through the glass substrate, as illustrated by representative field lines 178. The resultant electric field is strongest at the element electrode in closest proximity to the magnet element 164, which in this example is element electrode 172*b*. The electric field is weaker at element electrodes 172*a* and 172*c*, and essentially is negligible at element electrode 172*d*. In this manner, this method of driving causes the element array to function as a capacitive array sensor that can detect the position and proximity of the magnet element 160 that is external to the microfluidic cartridge 161. By applying a voltage signal to the magnet element, it may be detected by the capacitance across the sensor array. Droplet location further may be determined using integrated impedance sensor circuitry or other sensing mechanisms as referenced above with reference to FIG. 6.

FIG. 18 is a drawing depicting an output image 180 that is derived from output currents measured from the element array 172 when a voltage perturbation is applied to the magnet element 160. The electrical interaction of the magnet element with the element array is indicated by the output image, with the shading in this example representing the degree of proximity of array elements to the magnet element with the darkest image portion 182 corresponding to the array element closest to the magnet element. Image portions that correspond to array elements farther form the magnet element are illustrated with less dark shading, with the shading darkness decreasing with distance from the magnet element. In this manner, the position of the magnet element relative to the element array is detectable to a resolution of around one array element (pixel). Such resolution is achieved with any common sized pixel in an AM-EWOD device, such as for example electrode widths of 200 um, 100 um or 50 um.

In the example of FIGS. 17 and 18, the magnet element sensing is considered active sensing in that the output image is derived from measuring the output current in response to a voltage perturbation applied to the magnet element. For array element circuitry of high sensitivity, passive sensing of a conductive magnet element can be sufficient provided such circuitry is sufficiently sensitive to detect a passive conductive magnet element to which no electrical signal or perturbation is applied. An example of such a high-sensitive circuit is described in Applicant's application Ser. No. 16/207,789 filed on Dec. 3, 2018, the contents of which are incorporated here by reference. In such example, the sensing circuitry is improved by enhancing the sensitivity to very small capacitance variations, which for the present invention can be associated with magnet element positioning even without applying a voltage perturbation to the magnet element. As a non-limiting example of a high-sensitive circuit, to accomplish such enhanced sensitivity in the circuit design of the '789 application, a pre-charging effect is applied whereby the sensor readout transistor in an array element is altered to turn on the sensor readout transistor during a sensing phase. For example, a positive pre-charging voltage may be applied across the gate and source of the sensor readout transistor to turn said transistor on, or a negative voltage may be applied across the gate and source of a p-type sensor readout transistor to turn on the sensor readout transistor. The element array may be operated in either a self or mutual capacitance mode as described in the '789 Application. The positioning of the magnet element in near proximity to the element array results in interaction with the electric field distribution in a similar way as shown in FIG. 17, which results in a change in the capacitance measured as "present" at an electrode within the array. Additional sensing details in relation to a magnet element are described in the '063 application.

Figure 19A:
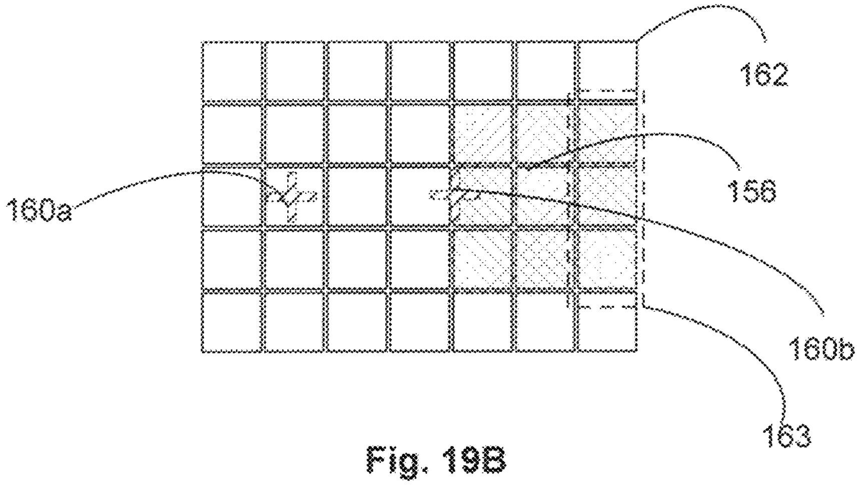
FIGS. 19A and 19B are drawings depicting another exemplary method of separating magnetically responsive particles from a polar liquid droplet in an EWOD device.
Figure 19B:
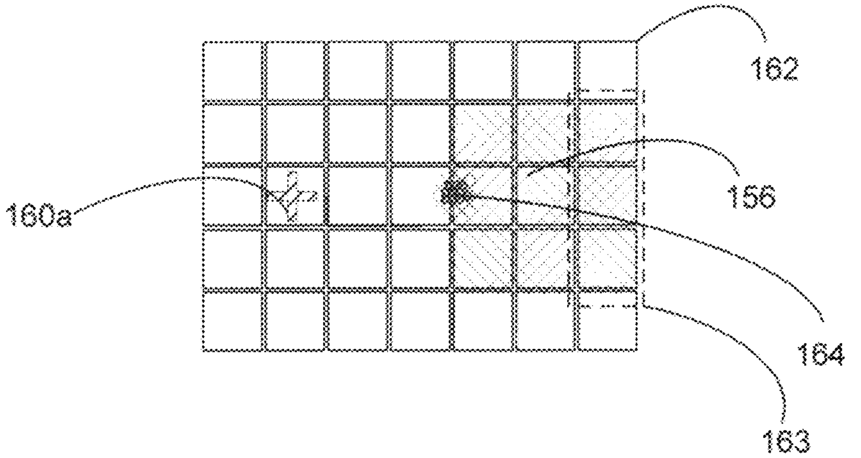

FIGS. 19A and 19B are drawings depicting another exemplary method of separating magnetically responsive particles from a polar liquid droplet in an EWOD device, in which two magnet elements 160*a* and 160*b* also are used. In this example, the second magnet element 160*b* is used to apply a magnetic field to pellet the magnetically responsive particles into the aggregation 164 within the droplet 156. The second magnet 160*b* is then withdrawn, as the magnetically responsive particles are efficiently clumped. Separation is then performed using the first magnet element 160*a* per any of the previous embodiments. An advantage is that pre-pelleting the magnetically responsive particles makes their removal highly efficient, such that very few magnetically responsive particles remain in the droplet.

Figure 20A:
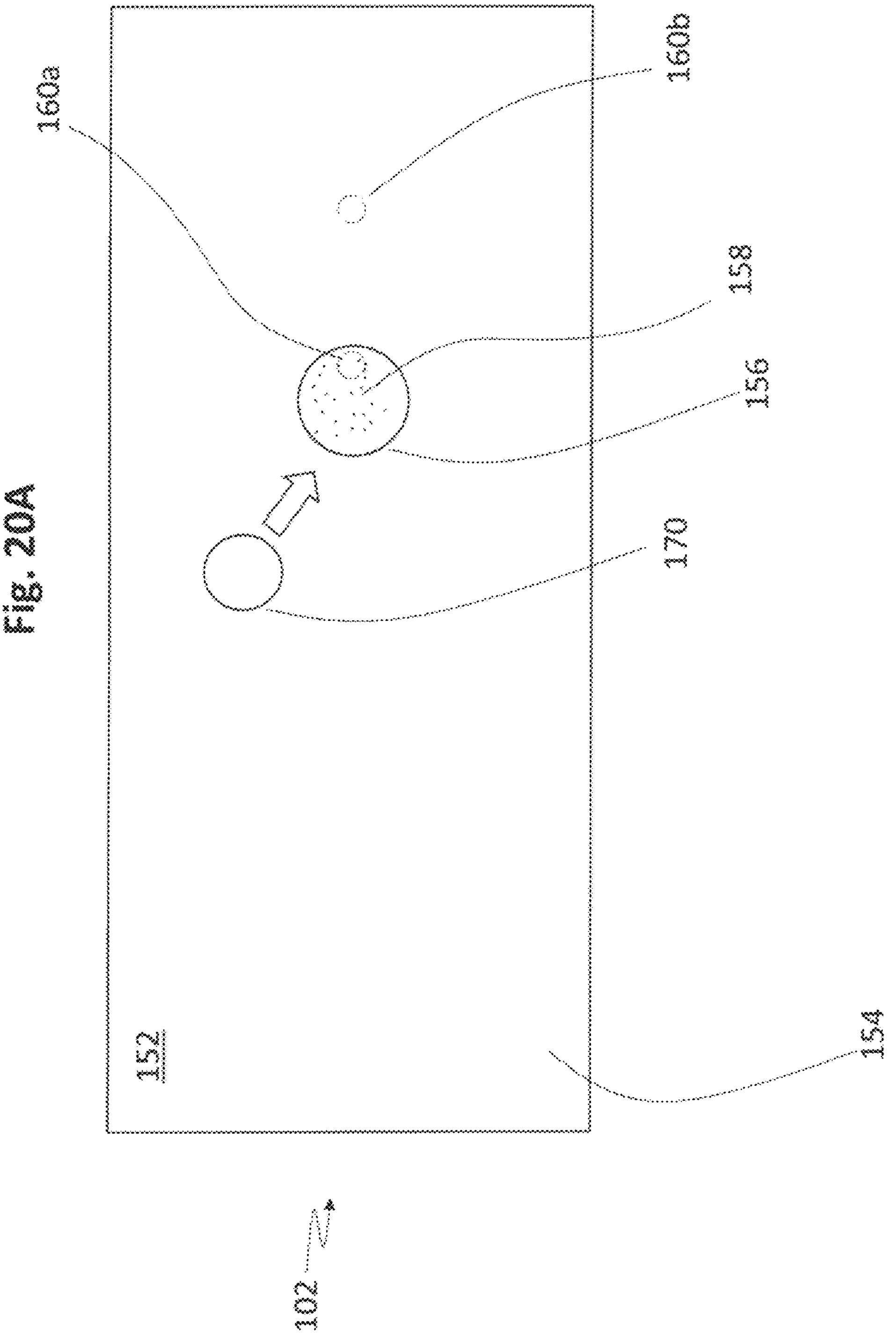
FIGS. 20A, 20B and 20C are drawings depicting another exemplary method separating magnetically responsive particles from a polar liquid droplet in an EWOD device, whereby the viscosity of the droplet is changed by the addition of a modifier droplet
Figure 20B:
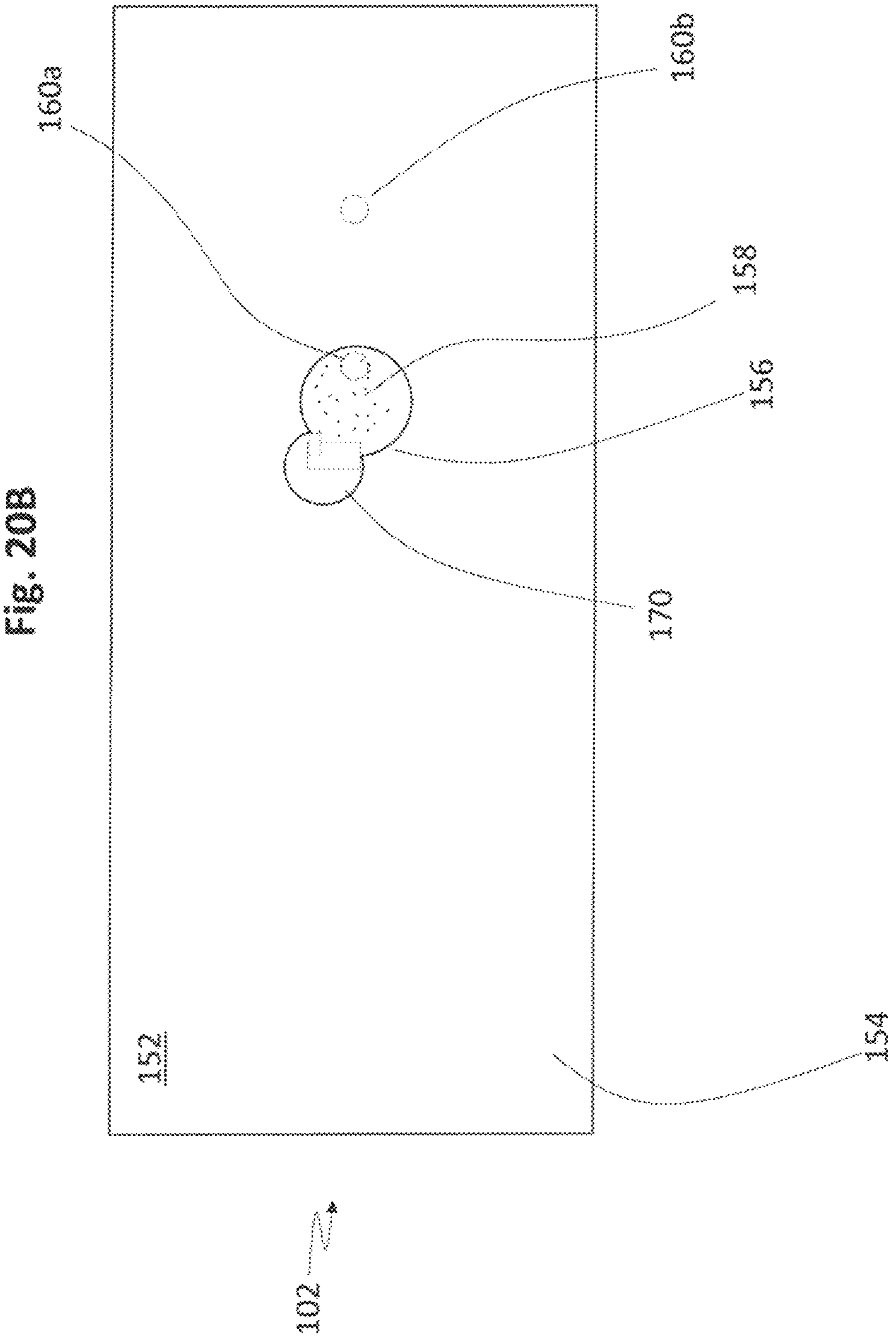
Figure 20C:
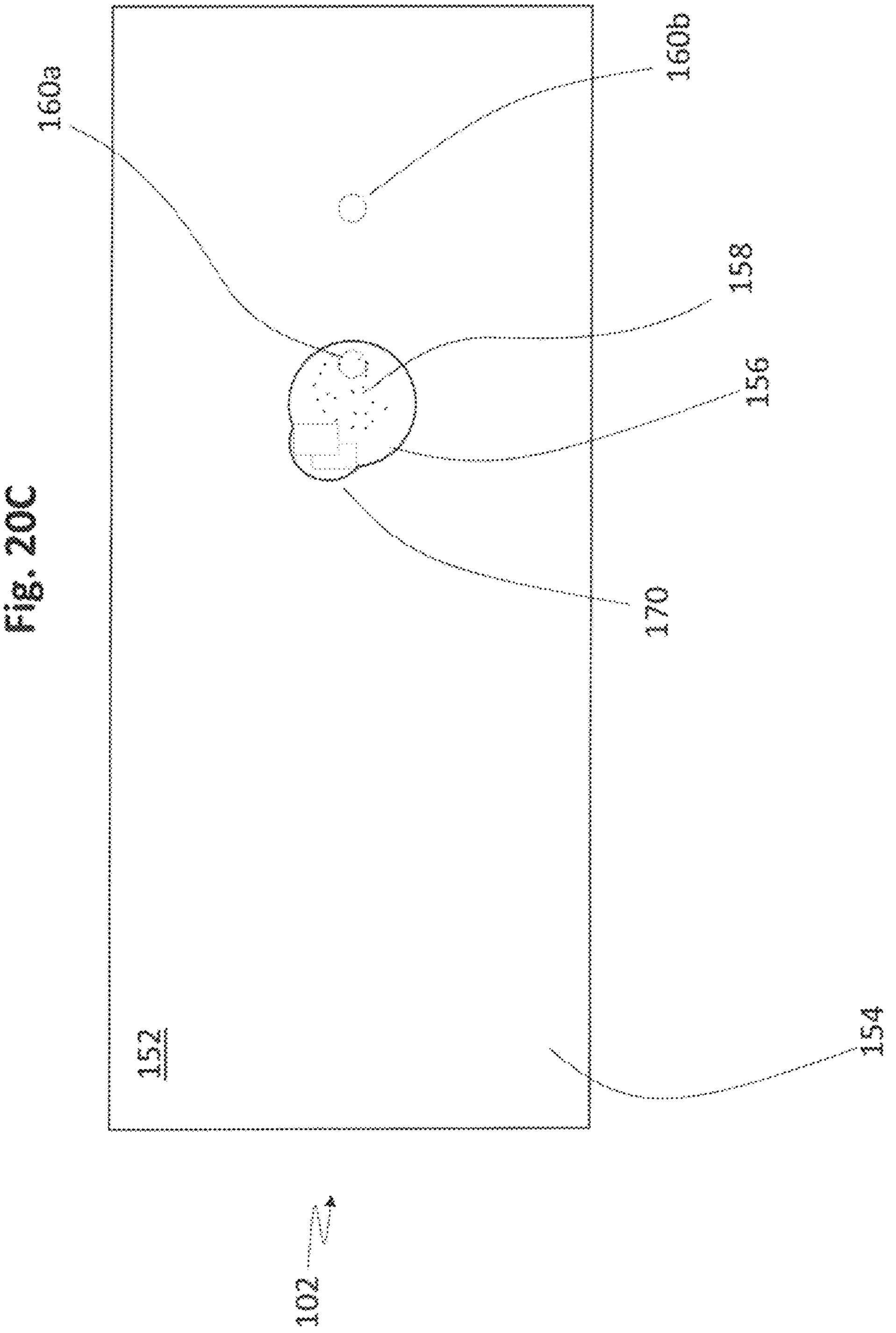

FIGS. 20A-20C are drawings depicting another exemplary method of separating magnetically responsive particles from a polar liquid droplet in an EWOD device, whereby the viscosity of the droplet is changed by the addition of a 5 modifier droplet. In such embodiment, a polar droplet is processed to increase the viscosity prior to operating the magnet element to apply the electric field for performing the separation step as to the magnetically responsive particles. Increasing viscosity may be accomplished by mixing with a modifier droplet 170 of high viscosity material, for example a droplet containing a significant proportion of 10 glycerol, for example 10-50% glycerol, or a droplet comprising a significant proportion of polyethylene glycol (PEG). The modifier droplet may be moved by electrowetting, merged, and optionally mixed with the droplet 56, prior to bead aggregation. According to a variant of this embodiment, the viscosity of the droplet 156 may be modified by mixing with a modifier droplet 170 that causes a chemical 15 reaction to occur so that the original droplet becomes highly viscous or forms a gel. Increasing the viscosity could also be accomplished by changing the temperature of the droplet.

In another exemplary embodiment, a polar droplet is processed to decrease the surface tension with the non-polar fluid, prior to operating the magnet element to apply the electric field for performing the separation step as to the magnetically responsive particles. This increases the ability of the magnetically responsive particles to transfer from the droplet successfully, more easily penetrating the outer meniscus caused by the surface tension. Decreasing the surface tension may be achieved by changing the temperature or adding an additional droplet containing a surfactant to the original droplet before performing the separation operation.

Embodiments of the present application have significant advantages over conventional processing. The described embodiments selectively separate magnetically responsive particles from a droplet of polar fluid with a minimal volume of polar fluid accompanying the separated magnetically responsive particles. Enhanced efficiency of collection of magnetically responsive particles may be achieved by the capability to perform repeated magnetic capture steps. Minimized surface area, i.e., a minimal number of array elements occupied by the separation step, within the microfluidic cartridge is used to achieve successful separation of the magnetically responsive particles, which permits use of other areas of the device for other reaction steps. There also is a reduced likelihood of any magnetically responsive particles becoming irreversibly embedded in the microfluidic device surfaces.

The following describes examples, which are non-limiting, of use of the embodiments of the present application. In one example, embodiments of the present application may be used for isolation of a target nucleic acid. A sample suspected of containing a target nucleic acid of interest is provided within a microfluidic device, for example such as described above with reference to FIGS. 1-19. Initially the sample is dispensed into a series of sample droplets. Droplets are subjected to a sequence of reaction steps, including lysis and dilution as are known in the art, to release target intracellular nucleic acid into a buffer within a droplet.

Magnetically responsive particles are provided within a second droplet, which is dispensed into the reaction chamber of the microfluidic device. The sample droplet is subsequently merged with the magnetically responsive particle containing droplet, and the droplets are mixed to ensure a homogeneous distribution of the magnetically responsive particles within the sample suspected of containing a nucleic acid of interest. The magnetically responsive particles provided in the system are previously prepared such that they will selectively bind to the target nucleic acid of interest, if present in the sample.

Once the magnetically responsive particles have been incubated within the sample for enough time to ensure capture of nucleic acid on the magnetically responsive particles, the droplet is brought into proximity of a magnetic element contained within the microfluidic device. Magnetically responsive particles that have acquired the target nucleic acid are thus aggregated above the location of the magnetic element, and separated away from the initial droplet that may contain contaminants according to any of the embodiments described above.

Following extraction of magnetically responsive particles carrying target nucleic acid from the initial sample droplet, the magnet element may be lowered before a droplet of clean buffer is moved by electrowetting to engulf the aggregated magnetically responsive particles. By a process of agitation, the magnetically responsive particles may then be re-suspended throughout the volume of the droplet. If warranted, as described above according to certain embodiments, a further cycle of aggregating the magnetically responsive particles above the magnetic element, followed by re-dispersion into another droplet of buffer, may be performed.

When the magnetically responsive particles populated with the target nucleic acid of interest have been sufficiently washed, the magnetically responsive may then be transferred into an elution droplet. Initially the magnetically responsive particles are again aggregated above the magnetic element before being re-suspended into a droplet of elution buffer, which contains an agent that will release the target nucleic acid from the surface of the magnetically responsive particles. The particles are again aggregated above the magnetic element to yield a droplet that contains only the target nucleic acid of interest, diluted in elution buffer. The droplet containing purified nucleic acid subsequently may be subjected to a range of processes, including but not limited to, nucleotide sequencing, polymerase chain reaction, isothermal amplification, and the like.

In another example, embodiments of the present application may be used for performing an immunoassay. A sample suspected of containing a target of interest may be subjected to an immunoassay within a microfluidic device, for example such as described above with reference to FIGS. 1-19. Magnetically responsive particles are provided that are bound at the surface to an immobilized capture antibody within the microfluidic device. Exemplary antibodies including anti-hCG, anti-Tni, anti-BNP may be utilized.

Sample droplets suspected of containing the target of interest are introduced into the reaction chamber. Sample droplets are subsequently mixed with droplets containing the capture antibody modified magnetically responsive particles, along with labelling antibodies. Droplets are then mixed and allowed to incubate to ensure capture of target species on the magnetically responsive particle immobilized antibody, and subsequent labelling thereof. After sufficient incubation, the sample droplet is moved into proximity of a magnetic element contained within the microfluidic device to separate the magnetically responsive particle target complexes, away from the remainder of the sample and any unbound labelling antibodies, according to any of the embodiments described above. The magnetically responsive particles are subsequently re-suspended in a buffer, and a further aggregation step is performed before the magnetically responsive particles with associated target and labelling antibody are subsequently taken up into a detection droplet.

Detection may be performed in a number of ways as are known in the art, including for example fluorescence detection, luminescence detection, or electrochemical detection. When fluorescence detection is used, it is possible to perform multiplex assays, in which labelling antibodies against different targets are prepared with distinct fluorescent labels, which may be determined together in the same sample without interference. When electrochemical detection is used, an enzyme such as horse radish peroxidase, which converts a non-electrochemically active species, such as 2,2'-azino-bis(3-ethylbenzthiazoline-6-sulphonic acid) (ABTS) in the presence of hydrogen peroxide to oxidized-ABTS, which can be determined electrochemically. The process of capture, washing and detection may thus be performed in multiplicate within the microfluidic device, using significantly lower total sample volume than might otherwise be achieved using more traditional assay formats, thereby increasing statistical confidence in the measurement result.

An aspect of the invention, therefore, is a method of operating an EWOD device to employ a magnetic field to separate magnetically responsive particles from a polar liquid droplet. In exemplary embodiments, the method includes the steps of dispensing a liquid droplet onto an element array of the EWOD device, wherein the liquid droplet includes magnetically responsive particles; performing an electrowetting operation to move the liquid droplet along the element array to a location relative to a magnet element of the EWOD device; operating the magnet element to apply a magnetic field to the liquid droplet, wherein at least a portion of the magnetically responsive particles aggregate within the liquid droplet in response to the magnetic field; and separating the aggregated magnetically responsive particles from the liquid droplet with the magnetic field, wherein the aggregated magnetically responsive particles move in response to the magnetic field to a location on the element array in proximity to the magnet element. The method of operating may include one or more of the following features, either individually or in combination.

In an exemplary embodiment of the method of operating, the method further includes removing an electrowetting force of the electrowetting operation from the liquid droplet prior to operating the magnet element to apply the magnetic field.

In an exemplary embodiment of the method of operating, the method further includes maintaining an electrowetting force on the liquid droplet to maintain the liquid droplet in an actuated state prior to operating the magnet element;

performing an electrowetting operation to orient the actuated droplet with a straight edge facing the magnet element; operating the magnet element to apply the magnetic field to the liquid droplet, wherein at least a portion of the magnetically responsive particles aggregate within the liquid droplet in response to the magnetic field along the straight edge; and removing the electrowetting force to de-actuate the liquid droplet to separate the aggregated magnetically responsive particles from the liquid droplet with the magnetic field.

In an exemplary embodiment of the method of operating, the method further includes maintaining an electrowetting force on the liquid droplet to maintain the liquid droplet in an actuated state prior to operating the magnet element; performing an electrowetting operation to orient the actuated droplet with a non-straight edge facing the magnet element; and operating the magnet element to apply the magnetic field to the liquid droplet, wherein at least a portion of the magnetically responsive particles aggregate within the liquid droplet in response to the magnetic field along the non-straight edge; wherein the aggregated magnetically responsive particles separate from the liquid droplet at the non-straight edge in response to the magnetic field.

In an exemplary embodiment of the method of operating, the method further includes performing an electrowetting operation to move the liquid droplet along the element array to a location relative to a first magnet element and a second magnet element of the EWOD device; operating the first magnet element to apply a first magnetic field to the liquid droplet, wherein a portion of the magnetically responsive particles aggregate within the liquid droplet in response to the first magnetic field; performing another electrowetting operation to move the liquid droplet along the element array relative to the first magnet element, wherein additional magnetically responsive particles aggregate within the liquid droplet in response to the first magnetic field as the liquid droplet is moved relative to the first magnet element; operating the first magnet element to remove the first magnetic field from the liquid droplet; operating the second magnet element to apply a second magnetic field to the liquid droplet; and separating the aggregated magnetically responsive particles from the liquid droplet with the second magnetic field, wherein the aggregated magnetically responsive particles move in response to the second magnetic field to a location on the element array in proximity to the second magnet element.

In an exemplary embodiment of the method of operating, the method further includes removing an electrowetting force of the electrowetting operation prior to operating the second magnet element to apply the second magnetic field.

In an exemplary embodiment of the method of operating, multiple iterations of aggregation and separation of the magnetically responsive particles are performed in response to applying the magnetic field.

In an exemplary embodiment of the method of operating, the method further includes, when a number of remaining magnetically responsive particles is insufficient to separate from the liquid droplet in response to the magnetic field, adding additional magnetically responsive particles to the liquid droplet, wherein the aggregated magnetically responsive particles including the additional magnetically responsive particles separate from the liquid droplet in response to the magnetic field.

In an exemplary embodiment of the method of operating, aggregating the magnetically responsive particles within the liquid droplet in response to the magnetic field does not induce bulk movement of the liquid droplet. In an exemplary embodiment of the method of operating, the liquid droplet includes a polar liquid, and the liquid droplet is dispensed into a non-polar liquid on the element array of the EWOD device.

In an exemplary embodiment of the method of operating, the magnet element is a permanent magnet, and the magnet element is moved by an actuator 5 in the EWOD device relative to the element array from a withdrawn position to an elevated position to apply the magnetic field.

In an exemplary embodiment of the method of operating, the magnet element is an electromagnet, and the magnet element is operated from an off state to an on state to apply the magnetic field.

In an exemplary embodiment of the method of operating, the EWOD device further includes sensing circuitry, and the method further comprises reading the output of the sensing circuitry to determine a location of the magnet element and/or the liquid droplet to position the liquid droplet relative to the magnet element.

In an exemplary embodiment of the method of operating, the method further includes applying a voltage perturbation to the magnet element, and reading the output from the sensing circuitry in response to the voltage perturbation applied to the magnet element.

In an exemplary embodiment of the method of operating, the method further includes preventing return of the separated magnetically responsive particles to the liquid droplet by the steps of: employing sensor feedback to determine whether the liquid droplet has moved toward the magnet element; and performing an electrowetting operation to move the liquid droplet away from the magnet element and/or operating the magnet element to remove the electric field.

In an exemplary embodiment of the method of operating, the method further includes, prior to operating the magnet element, incubating the magnetically responsive particles for a sufficient time to bind the magnetically responsive particles to target particles.

In an exemplary embodiment of the method of operating, the method further includes increasing a viscosity of the liquid droplet prior to operating the magnet element to apply the magnetic field.

In an exemplary embodiment of the method of operating, the method further includes decreasing a surface tension of the liquid droplet prior to operating the magnet element to apply the magnetic field.

Another aspect of the invention is a microfluidic system that includes an electrowetting on dielectric (EWOD) device comprising an element array configured to receive a liquid droplet, the element array comprising a plurality of individual array elements; a magnet element operable to apply an electric field to the element array; and a control system configured to control actuation voltages applied to the element array to perform droplet manipulation operations, and to control operation of the magnet element to apply the electric field, to perform the method of operating an EWOD device according to any of the embodiments.

Another aspect of the invention is a non-transitory computer-readable medium storing program code which is executed by a processing device for controlling operation of an electrowetting on dielectric (EWOD) device, the program code being executable by the processing device to perform the method of operating an EWOD device according to any of the embodiments Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used for optical detection of biochemical or physiological materials, such as for cell detection and cell counting. Applications include healthcare diagnostic testing, material testing, chemical or biochemical material synthesis, proteomics, tools for research in life sciences and forensic science.

The invention claimed is:

1. A method of operating an electrowetting on dielectric (EWOD) device that performs electrowetting operations on liquid droplets dispensed onto an element array of the EWOD device, the method of operating comprising the steps of:

dispensing a liquid droplet onto the element array of the EWOD device, wherein the liquid droplet includes magnetically responsive particles;

performing an electrowetting operation to move the liquid droplet along the element array to a first location on the element array;

operating a magnet element, at a second location of the EWOD device different from the first location, from a first state in which no magnetic field is applied to the liquid droplet to a second state to apply a magnetic field to the liquid droplet, aggregating at least a portion of the magnetically responsive particles within the liquid droplet in response to the magnetic field; and separating the aggregated magnetically responsive particles from the liquid droplet with the magnetic field by the aggregated magnetically responsive particles moving in response to the magnetic field to the second location on the element array of the magnet element.

2. The method of operating of claim 1, further comprising removing an electrowetting force of the electrowetting operation from the liquid droplet prior to operating the magnet element to apply the magnetic field.

3. The method of operating of claim 1, further comprising:

performing an electrowetting operation to orient the actuated droplet with a straight edge facing the magnet element;

while maintaining an electrowetting force on the liquid droplet to maintain the liquid droplet in an actuated state, operating the magnet element to apply the magnetic field to the liquid droplet, wherein at least a portion of the magnetically responsive particles aggregate within the liquid droplet in response to the magnetic field along the straight edge; and removing the electrowetting force to de-actuate the liquid droplet to effect separation of the aggregated magnetically responsive particles from the liquid droplet with the magnetic field.

4. The method of operating of claim 1, further comprising:

performing an electrowetting operation to orient the actuated droplet with a non-straight edge facing the magnet element; and while maintaining an electrowetting force on the liquid droplet to maintain the liquid droplet in an actuated state, operating the magnet element to apply the magnetic field to the liquid droplet, wherein at least a portion of the magnetically responsive particles aggregate within the liquid droplet in response to the magnetic field along the non-straight edge;

wherein the aggregated magnetically responsive particles separate from the liquid droplet at the non-straight edge in response to the magnetic field.

5. The method of operating of claim 1, further comprising:

performing another electrowetting operation to move the liquid droplet along the element array relative to the first magnet element, wherein additional magnetically responsive particles aggregate within the liquid droplet in response to the first magnetic field as the liquid droplet is moved relative to the first magnet element;

operating the first magnet element to remove the first magnetic field from the liquid droplet;

operating a second magnet element of the EWOD device to apply a second magnetic field to the liquid droplet; and separating the aggregated magnetically responsive particles from the liquid droplet with the second magnetic field, wherein the aggregated magnetically responsive particles move in response to the second magnetic field to a location on the element array in proximity to the second magnet element.

6. The method of operating of claim 5, further comprising removing an electrowetting force of the electrowetting operation prior to operating the second magnet element to apply the second magnetic field.

7. The method of operating of claim 1, wherein multiple iterations of aggregation and separation of the magnetically responsive particles is performed in response to applying the magnetic field.

8. The method of operating of claim 7, further comprising, in response to determining that a number of remaining magnetically responsive particles is insufficient to separate from the liquid droplet in response to the magnetic field, adding additional magnetically responsive particles to the liquid droplet, wherein the aggregated magnetically responsive particles including the additional magnetically responsive particles separate from the liquid droplet in response to the magnetic field.

9. The method of operating of claim 1, wherein aggregating the magnetically responsive particles within the liquid droplet in response to the magnetic field does not induce bulk movement of the liquid droplet.

10. The method of operating of claim 1, wherein the liquid droplet includes a polar liquid, and the liquid droplet is dispensed into a non-polar liquid on the element array of the EWOD device.

11. The method of operating of claim 1, wherein the magnet element is a permanent magnet, and the magnet element is moved by an actuator in the EWOD device relative to the element array from a withdrawn position to an elevated position to apply the magnetic field.

12. The method of operating of claim 1, wherein the magnet element is an electromagnet, and the magnet element is operated from an off state to an on state to apply the magnetic field.

13. The method of operating of claim 1, wherein the EWOD device further include sensing circuity, and the method further comprises reading the output of the sensing circuitry to determine a location of one of the magnet elements and/or the liquid droplet to position the liquid droplet relative to the one magnet element.

14. The method of operating claim 13, further comprising applying a voltage perturbation to the one magnet element of the magnet elements, and reading the output from the sensing circuitry in response to the voltage perturbation applied to the one magnet element.

15. The method of operating of claim 13, further comprising preventing return of the separated magnetically responsive particles to the liquid droplet by the steps of:

employing sensor feedback to determine whether the liquid droplet has moved toward the one magnet element; and performing an electrowetting operation to move the liquid droplet away from the magnet element and/or operating the magnet element to remove the magnetic field.

16. The method of operating of claim 1, further comprising, prior to operating the or each magnet element, incubating the magnetically responsive particles for a sufficient time to bind the magnetically responsive particles to target particles.

17. The method of operating of claim 1, further comprising increasing a viscosity of the liquid droplet prior to operating the or each magnet element to apply the magnetic field.

18. The method of operating of claim 1, further comprising decreasing a surface tension of the liquid droplet prior to operating the or each magnet element to apply the magnetic field.

19. A microfluidic system configured to perform the method of operating the EWOD device according to claim 1 comprising:

the electro-wetting on dielectric (EWOD) device comprising the element array that receives the liquid droplet, the element array comprising a plurality of individual array elements;

the magnet element operable to apply the magnetic field to the element array; and a control system configured to control actuation voltages applied to the element array to perform the electrowetting operation to move the liquid droplet along the element array to a first location on the element array, and to control operation of the magnet element from the first state in which no magnetic field is applied to the liquid droplet to the second state to apply the magnetic field to the liquid droplet, to perform the method of operating the EWOD device according to claim 1.

* * * * *